(12) United States Patent
Okamura et al.

(10) Patent No.: US 7,630,317 B2
(45) Date of Patent: Dec. 8, 2009

(54) TRANSMISSION BANDWIDTH CONTROL DEVICE

(75) Inventors: Akiko Okamura, Kawasaki (JP); Koji Nakamichi, Kawasaki (JP); Hitoshi Yamada, Kawasaki (JP); Akira Nagata, Kawasaki (JP); Katsuichi Nakamura, Yokohama (JP); Seiji Nomiyama, Yokohama (JP); Mitsunori Fukazawa, Kawasaki (JP); Nobuhiro Kawamura, Kawasaki (JP); Sugiko Itagaki, Kawasaki (JP); Takashi Iwasaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 978 days.

(21) Appl. No.: 10/769,701

(22) Filed: Jan. 30, 2004

(65) Prior Publication Data
US 2004/0184483 A1   Sep. 23, 2004

(30) Foreign Application Priority Data
Jan. 31, 2003   (JP) ............................. 2003-024950

(51) Int. Cl.
*H04L 12/28* (2006.01)
(52) U.S. Cl. .................... 370/237; 370/395.43; 709/235
(58) Field of Classification Search ......... 370/229–238, 370/477, 395.2, 395.21, 395.41, 395.42, 370/395.43, 395.4; 709/235, 238, 239, 240, 709/242, 244, 228, 229
See application file for complete search history.

(56) References Cited

U.S. PATENT DOCUMENTS

| | | | | |
|---|---|---|---|---|
| 6,115,372 A * | 9/2000 | Dinha | ......................... | 370/352 |
| 6,493,317 B1 * | 12/2002 | Ma | ............................ | 370/237 |
| 6,590,867 B1 * | 7/2003 | Ash et al. | .................... | 370/236 |
| 6,721,270 B1 * | 4/2004 | Mitra et al. | ................. | 370/230 |
| 6,788,646 B1 * | 9/2004 | Fodor et al. | ................. | 370/230 |
| 6,956,821 B2 * | 10/2005 | Szviatovszki et al. | ....... | 370/237 |
| 7,136,357 B2 * | 11/2006 | Soumiya et al. | ............. | 370/236 |
| 7,257,632 B2 * | 8/2007 | Zhang et al. | ................ | 709/226 |
| 7,310,341 B2 * | 12/2007 | Prager et al. | ............. | 370/395.5 |
| 2002/0174246 A1 * | 11/2002 | Tanay et al. | ................. | 709/238 |

FOREIGN PATENT DOCUMENTS

EP   0 926 919   6/1999

(Continued)

OTHER PUBLICATIONS

Chinese Office Action dated Nov. 4, 2005.

(Continued)

*Primary Examiner*—Aung S Moe
*Assistant Examiner*—Habte Mered
(74) *Attorney, Agent, or Firm*—Katten Muchin Roseman LLP

(57) ABSTRACT

Included are a network information database for storing the statistical information collected from a router, a user request processing unit for accepting and processing a flow forwarding request from a user terminal connected to the network, a route control unit for searching for a route corresponding to the request from the user terminal by referring to the network information database, a load sharing control unit for executing such a load sharing process as to generate router setting information for sharing a transmission load of the network by referring to the network information database, and a router control unit for setting a router based on the route information determined by the route control unit and on the router setting information generated by the load sharing control unit.

28 Claims, 29 Drawing Sheets

FOREIGN PATENT DOCUMENTS

| EP | 1 130 849 | 9/2001 |
|---|---|---|
| JP | 2001-144804 | 5/2001 |
| JP | 2001-320420 | 11/2001 |
| WO | WO 02/23807 | 3/2002 |

OTHER PUBLICATIONS

Anwar Elwalid, et al. "MATE: MPLS Adaptive Traffic Engineering" Proceedings IEEE Infocom, vol. 1 of 3, Conf. 20, Apr. 22, 2001, pp. 1300-1309, XP010538821.

Yamada, et al., "Dynamic Traffic Engineering for Network Optimization-Architecture and Evaluation" The $6^{th}$ Asia-Pacific Network Operations and Management Symposium, Sep. 25, 2002.

Ikenaga, et al., "Performance Evaluation of Dynamic Rerouting Algorithm for Class Based QoS Traffic" Nov. 2000, pp. 45-50.

Takashima, et al., "Dynamic Traffic Engineering: Creating New Services" $4^{th}$ Asia-Pacific Symposium on Information and Telecommunication Technologies, Nov. 5, 2001.

Nakamichi, et al., "Dynamic Traffic Engineering Under Different Traffic Patterns", 2002 CQR International Workshop on Communication Quality and Reliability, May 4, 2002.

Katoh, et al., "A Study of IP Traffic Engineering Mechanisms" Neue Kommunikations-anwendungen in modernen Netzen, Feb. 2002.

Haider, Saira Bano, Jun. 12, 2008 Office Action from U.S. Appl. No. 11/104,759 filed Apr. 13, 2005 (10 pp.).

Harlan, Robert D., Nov. 7, 2005 Office Action from U.S. Appl. No. 11/117,981 filed Apr. 29, 2005 (7 pp.).

Harlan, Robert D., Jul. 20, 2006 Office Action from U.S. Appl. No. 11/117,981 filed Apr. 29, 2005 (6 pp.).

Harlan, Robert D., Jan. 26, 2007 Office Action from U.S. Appl. No. 11/117,981 filed Apr. 29, 2005 (8 pp.).

Harlan, Robert D., Jul. 12, 2007 Office Action from U.S. Appl. No. 11/117,981 filed Apr. 29, 2005 (6 pp.).

Harlan, Robert D., Jan. 2, 2008 Office Action from U.S. Appl. No. 11/117,981 filed Apr. 29, 2005 (6 pp.).

Harlan, Robert D., Jul. 25, 2008 Office Action from U.S. Appl. No. 11/117,981 filed Apr. 29, 2005 (8 pp.).

Maksymonko, John M., Feb. 20, 2008 Office Action from U.S. Appl. No. 11/305,279 filed Dec. 16, 2005 (14 pp.).

Maksymonko, John M., Aug. 6, 2008 Office Action from U.S. Appl. No. 11/305,279 filed Dec. 16, 2005 (11 pp.).

Maksymonko, John M., Jul. 17, 2008 Office Action from U.S. Appl. No. 11/305,281 filed Dec. 16, 2005 (13 pp.).

Le, Hoa T., Sep. 25, 2008 Office Action fom U.S. Appl. No. 11/612,554 filed Dec. 19, 2006 (8 pp).

Maksymonko, John M., Jun. 13, 2008 Office Action from U.S. Appl. No. 11/641,514 filed Dec. 19, 2006 (7 pp.).

Mullis, Jeffrey C., Oct. 31, 2008 Office Action from U.S. Appl. No. 11/641,514 filed Dec. 19, 2006 (10 pp.).

Maksymonko, John M., Jun. 11, 2008 Office Action from U.S. Appl. No. 11/642,124 filed Dec. 20, 2006 (16 pp.).

Maksymonko, John M., May 30, 2008 Office Action from U.S. Appl. No. 11/642,795 filed Dec. 20, 2006 (12 pp.).

Maksymonko, John M., May 28, 2008 Office Action from U.S. Appl. No. 11/642,802 filed Dec. 20, 2006 (10 pp.).

Chen, Jizhuang, Dec. 30, 2005 Office Action from Chinese Patent Application No. 02819527.2 filed Oct. 4, 2002 (9 pp.).

Chen, Jizhuang, Dec. 21, 2007 Office Action from Chinese Patent Application No. 02819527.2 filed Oct. 4, 2002 (12 pp.).

Chen, Jizhuang, Sep. 26, 2008 Office Action from Chinese Patent Application No. 02819527.2 filed Oct. 4, 2002 (4 pp.).

Schutte, M., Aug. 8, 2006 Office Action from European Patent Application No. 02807196.7 filed Oct. 4, 2002 (5 pp.).

Schutte, Maya, Sep. 3, 2007 Office Action from European Patent Application No. 02807196.7 filed Oct. 4, 2002 (2 pp.).

Watanabe, Y., May 7, 2008 Office Action from Japanese Patent Application No. 582224/2003 filed Oct. 4, 2002 (5 pp.).

Wantanbe, Y., Jul. 29, 2008 Office Action from Japanese Patent Application No. 582224-2003 filed Oct. 4, 2002 (17 pp.).

May 30, 2008 International Search Report from PCT Patent Application No. PCT/US2007/026031 filed Dec. 19, 2007 (4 pp.).

May 27, 2008 International Search Report from PCT Patent Application No. PCT/US2007/087869 filed Dec. 18, 2007 (4 pp.).

Aug. 25, 2008 International Search Report from PCT Patent Application No. PCT/US2008/068838 filed Jun. 30, 2008 (4 pp.).

* cited by examiner

| ROUTER 1 | LINK1_1 | SELF IP ADDRESS | CONNECTING DESTINATION IP ADDRESS | WL | WG | WB | Wg | Wb |
|---|---|---|---|---|---|---|---|---|
| | LINK1_2 | SELF IP ADDRESS | CONNECTING DESTINATION IP ADDRESS | WL | WG | WB | Wg | Wb |
| | ... | | | | | | | |
| | LINK1_N | SELF IP ADDRESS | CONNECTING DESTINATION IP ADDRESS | WL | WG | WB | Wg | Wb |
| ... | | | | | | | | |
| ROUTER K | LINK K_1 | SELF IP ADDRESS | CONNECTING DESTINATION IP ADDRESS | WL | WG | WB | Wg | Wb |
| | LINK K_2 | SELF IP ADDRESS | CONNECTING DESTINATION IP ADDRESS | WL | WG | WB | Wg | Wb |
| | ... | | | | | | | |
| | LINK K_M | SELF IP ADDRESS | CONNECTING DESTINATION IP ADDRESS | WL | WG | WB | Wg | Wb |

10b

WL: LINK PHYSICAL BANDWIDTH
WG: BANDWIDTH RESERVED FOR GS FLOW
WB: BANDWIDTH RESERVED FOR BES FLOW
Wg: BANDWIDTH USED FOR GS FLOW
Wb: BANDWIDTH USED FOR BES FLOW

FIG. 7

USER REQUEST SCREEN : 100

SERVERS :
- ☑ TOKYO
- ☐ OSAKA
- ☐ FUKUOKA

CONTENTS :

*Movies:*
- ☐ STAR MAN, (3h20m, 600 YEN)
- ☐ SPIDER (2h30m, 500 YEN)
- ☐ BEAUTIFUL MINE (2h40m, 500 YEN)

*Sports*
- ☑ 2002 Cup Final: Japan vs Spain (2h30m, 400Yen)

QUALITY :

*GUARANTEED*
- ☑ GOLD SERVICE (6.0 Mbps, + 200 YEN)
- ☐ SILVER SERVICE (1.5 Mbps, + 100YEN)
- ☐ BLONDS SERVICE (500 KBPS, + 50 YEN)

*NON-GUARANTEED*
- ☐ 500 kbps, ADDED FEE UNREQUIRED

FIG. 8

TRANSMISSION BANDWIDTH CONTROL DEVICE

BACKGROUND OF THE INVENTION

The present invention relates to a transmission bandwidth control technology in a network.

Generally, there are quality guaranty traffic forwarding methods and quality non-guaranty traffic forwarding systems as conventional technologies related to the transmission across the network.

Of the forwarding methods, for example, a Diffserv (Differentiated Services) system, an Intserv (Integrated. Services) system and an MPLS (Multi Protocol Label Switching) QoS (Quality of Service) path system, are given as the quality guaranty traffic forwarding systems on IP (Internet Protocol) networks.

Of the quality guaranty traffic forwarding systems, in the Diffserv system, an ingress router in the network distinguishes between traffic types, effects marking on a packet, and also restricts an inflow quantity of the traffic in accordance with a type of the packet. Further, in the Diffserv system, a priority is determined based on the traffic type. Therefore, the intra-network router forwards the packet according to this priority. This enables, in the Diffserv system, a quality of the quality guaranty traffic to be guaranteed.

Moreover, of the quality guaranty traffic forwarding systems, in the Intserv system, each router ensures a requested bandwidth for every flow by previously using an RSVP (Resource Reservation Protocol) protocol, whereby the quality can be maintained. Further, the Intserv system has a traffic control mechanism that rejects a request for the flow impossible of a bandwidth reservation by admission control, and guarantees the bandwidth for a queue in the router.

Further, of the quality guaranty traffic forwarding systems, in the MPLS (Multi Protocol Label Switching) QoS path system, each router ensures the bandwidth by use of RSVP-TE when a LSP is set up and allocates the quality guaranty traffic to the path, thereby making it possible to guarantee the quality of the quality guaranty traffic.

By the way, in the quality guaranty services, there might be a case where the path can not be set up on an optimal route depending on a traffic condition. For example, when the path can not be set up, a service providing side performs a service on a detour route. Further, in the case of being unable to ensure the bandwidth just when a quality guaranty traffic request is given from a terminal, in the quality guaranty traffic forwarding system, normally a call loss occurs.

For avoiding such a problem in these quality guaranty traffic forwarding systems, there is a method of reducing a call loss ratio by reallocating the existing flow to by far the shortest route. According to this method, a minimum-cost route is calculated for the quality guaranty traffic request from the terminal. At this time, when the calculated route contains only one link unable ensures the bandwidth, one flow contained in that link is selected. Then, this method schemes to make a reallocation to by far the different shortest route. When the route can be set up through this reallocation, there decreases the call loss of the request from the terminal.

Further, as non-guaranty traffic forwarding systems, there are hop-by-hop forwarding on a shortest route base and a dynamic load balancing system using multi-paths.

Of the non-guaranty traffic forwarding systems, in the hop-by-hop forwarding on the shortest route base, the shortest route is selected by a route search mechanism of IGP (Interior Gateway Protocol) such as OSPF (Open Shortest Path First). Then, the selected shortest route is reflected in a routing table of the router. At this time, the packets are forwarded packet by packet to a next hop while referring to the routing tables of the respective routers.

Further, of the non-guaranty forwarding systems, in the dynamic load balancing method using the multi-paths, the present inventors propose technologies of setting up a plurality of paths by MPLS and forwarding in a way that shares the traffic with the respective paths.

Moreover, the present inventors propose such a technology that functions required for the load balancing are distributed and allocated to a centralized control server and to the routers, and the function used as the necessity arises is switched over between the server and the router, thereby flexibly actualizing the centralized control and the distributed control.

First, generally the router for carrying out the existing systems forwards the guaranty traffic in preference to the non-guaranty traffic in order to guarantee a high throughput and a low delay of the quality guaranty traffic. Accordingly, in the case of letting the quality guaranty traffic and the non-guaranty traffic flow to the same link, as a quantity of the quality guaranty traffic increases, a quantity of the non-guaranty traffic that can be forwarded is restricted. Namely, the existing system has less of residual bandwidths for the non-guaranty traffic.

Therefore, in the non-guaranty traffic, when letting large quantity of packets, some are discarded due to the queue in the router.

Moreover, also in a case where there are links across which a large quantity of non-guaranty traffic flows, the existing system accepts and lets the quality guaranty traffic without considering that the large quantity of packets of non-guaranty traffic are to be discarded.

Still further, even by performing a link extension or raising a link speed in order to avoid discarding the packets of the non-guaranty traffic, as the link does not always come to state of congestion, it follows that a link using efficiency becomes lower than before the extension. Further, in this case, a problem was a rise in cost for the link extension.

Moreover, in the existing system, the quality guaranty path was not always set up on the best route, depending on the traffic condition. Then, in the existing system, there was a case in which if the bandwidth, though unable to ensure the bandwidth on the shortest route, can be ensured on a detour route, the detour route is to be selected.

As a system for steering clear of this problem, there is disclosed a technology of scheming to reallocate, when the requested quality is not met, the existing quality guaranty flow, i.e., the quality guaranty path to the best path.

SUMMARY OF THE INVENTION

According to the conventional technology, however, a route calculation based on Dijkstra algorithm must be performed whenever trying a reallocation of one single flow, and it was required that the repetitive calculations be performed till there is discovered by far the best route. Further, according to the conventional technology, on the occasion of shifting a path, it is required that the existing path is deleted and a path to a new route be set up. Moreover, there was one flow in which the route is improved by this method when there occurs a state of being unable to meet a requested quality.

The invention was devised in view of the items given above, and an object that should be accomplished is to provide a technology of performing, while maintaining a forwarding quality of quality guaranteed traffic and a forwarding quality of a non-guaranteed traffic in forwarding of the traffics, such an allocation as to ensure forwarding routes for both of them.

The invention adopted the following means in order to solve the problems.

Namely, the invention is a device for controlling a transmission route for a flow in a network, comprising, a statistical information collecting unit for collecting pieces of statistical information from respective routers connected to the network, a network information database for storing the statistical information collected, a user request processing unit for accepting and processing a flow forwarding request from a user terminal connected to the network, a route control unit for searching for a route corresponding to the request from the user terminal by referring to the network information database, a load balancing control unit for executing such a load balancing process as to generate router setting information for balancing a transmission load of the network by referring to the network information database, and a router control unit for setting a router based on the route information determined by the route control unit and on the router setting information generated by the load balancing control unit.

The invention is that the transmission route for the flow corresponding to the user request is set up, and the transmission-load-shared router setting information is generated.

Therefore, according to the invention, the transmission route for the flow in which the load state of the path in the network is shared, can be set up in a way that meets the user request.

Further, the invention is that the route control unit may include quality guaranteed route searching module searching for quality guaranteed route information corresponding to the forwarding request for the forwarding quality guaranteed flow by referring to link statistical information concerning links-between the respective routers from on the network information database and quality non-guaranteed route searching module searching for quality non-guaranteed route information corresponding to the forwarding request for the forwarding quality non-guaranteed flow, the load balancing control unit may execute the load balancing process by referring to the quality guaranteed route information and the quality non-guaranteed route information, and the router control unit may set the quality guaranteed route and the quality non-guaranteed route in accordance with the searched quality guaranteed route information and quality non-guaranteed route information.

Moreover, the invention is that it may further comprise a load judging unit for judging whether or not a load state of a path is equal to or smaller than the threshold value by referring to the link statistical information, when the load state of the path is equal to or smaller than the threshold value, the quality guaranteed route searching means may search for the quality guaranteed route information, the load balancing control unit may execute the load balancing process by referring to the quality guaranteed route information, and the router control unit may set the quality guaranteed route in accordance with the quality guaranteed route information.

Still further, the invention is that it may further comprise a congestion judging unit for judging by referring to the link statistical information whether a load state of the path falls into a congestion or not, wherein when the load state of the path falls into the congestion, the quality non-guaranteed route searching means may search for quality non-guaranteed route information, the load balancing control unit may execute the load balancing process by referring to the quality guaranteed route information and the quality non-guaranteed route information, and the router control unit may set a quality non-guaranteed route in accordance with the quality non-guaranteed route information.

Then, the invention is that the load balancing control unit may execute the load balancing process at an interval of a predetermined period.

BRIEF DESCRIPTION OF THE DRAWINGS

FIG. 7 shows a structure of a network information database;
FIG. 8 shows an example of a user request screen.

DETAILED DESCRIPTION OF THE INVENTION

Preferred embodiments of the invention will hereinafter be described with reference to the drawings.

In the embodiment, an extreme decline of a forwarding quality of a quality non-guaranteed flow because of a quality guaranteed flow is avoided. Further, in the embodiment, congestion is avoided by effectively utilizing network resources. What is given above will be explained as a policy 1 in the embodiment.

Further, in the embodiment, the extreme decline of the forwarding quality of the quality non-guaranteed flow because of the quality guaranteed flow is avoided, and the quality guaranteed flow is always allocated to an optimal route, thereby decreasing a call loss of a bandwidth guaranty service. What is given above will be explained as a policy 2 in the embodiment.

Moreover, in the following discussion in the embodiment, the quality guaranteed flow is referred to as a GS (Guaranteed Service) flow, while the quality non-guaranteed flow is referred to as a BES (Best Effort) Service) flow.

Note that, in this embodiment, the term of "load balancing" refers to distributing the load of inequality to plural paths in the flow. Namely, in this embodiment, "load balancing" and "load sharing" refer to both the meaning of distributing the load of plural paths in the flow with equality and distributing the load of plural paths in the flow with inequality.

Figure 1:
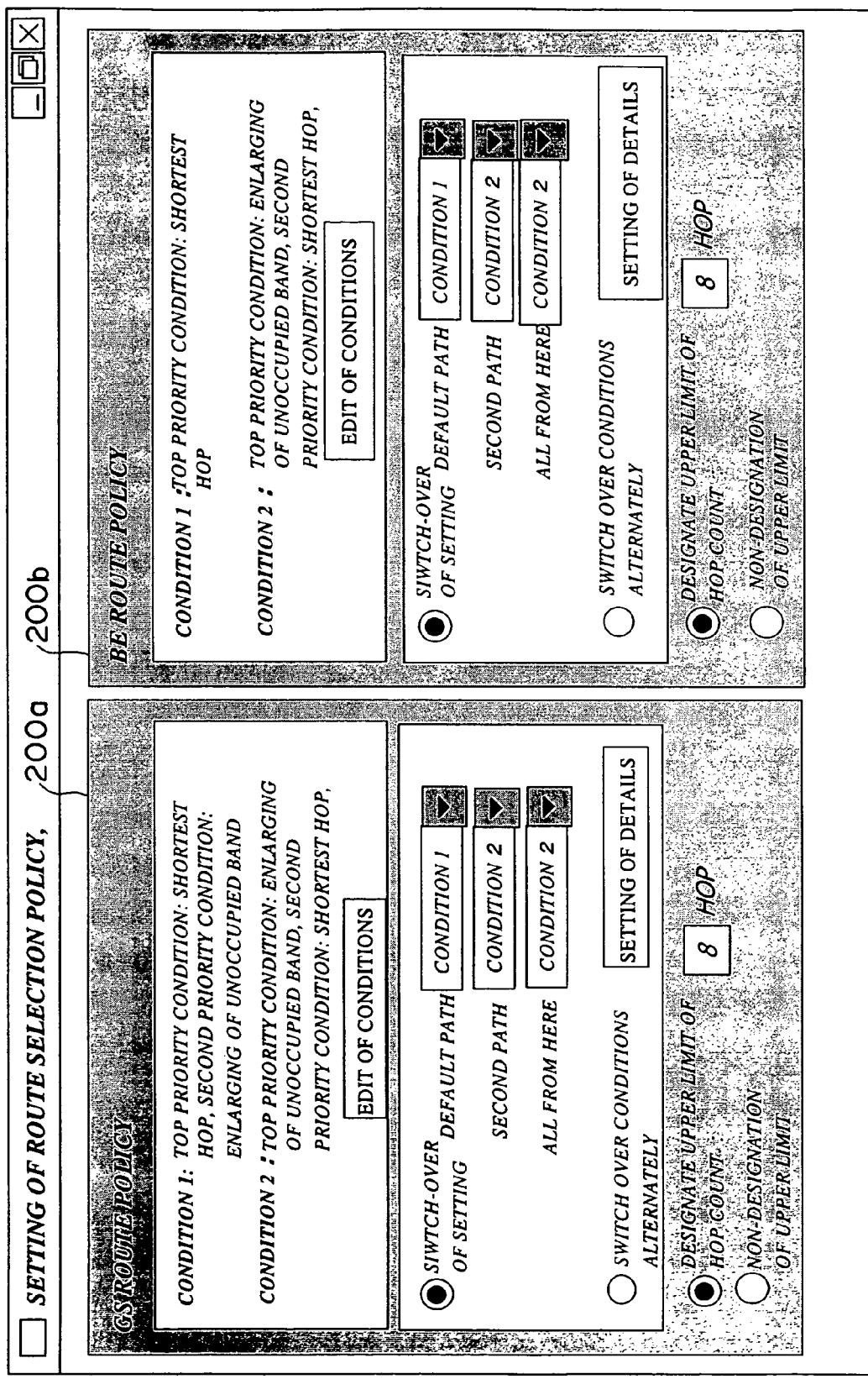
FIG. 1 shows an example of a policy setting screen.
Figure 2:
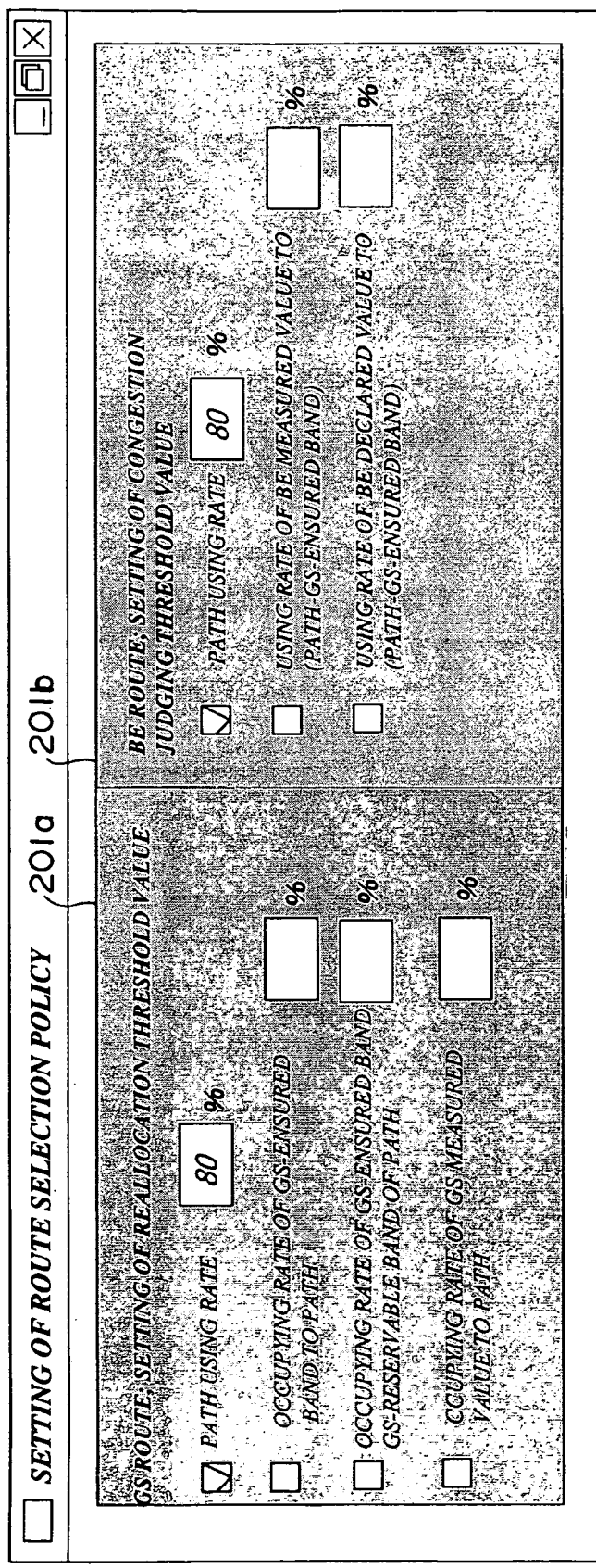
FIG. 2 shows an example 2 of a policy setting screen.

FIGS. 1 and 2 show one example of a policy setting screen for setting the policy in the embodiment. Note that the policy setting screen in FIG. 1 is marked with a numeral 200. Further, the policy setting screen in FIG. 2 is marked with a numeral 201.

The policy setting screen 200 in FIG. 1 has a GS route policy setting area 200a for a network administrator, etc. to input settings of a policy for setting a route about the GS flow and of a sub-policy. Further, this policy setting screen 200 has a BES route policy setting area 200b for the network administrator, etc. to input settings of a policy for setting a route about the BES flow and of a sub-policy.

Priority conditions about the route for the GS flow and the route for the BES flow are inputted as the policy settings and the sub-policy settings in the GS route policy setting area 200a and in the BES route policy setting area 200b. Moreover, conditions of switchover instructions, etc. of setting the policy and the sub-policy according to paths, can be also set in the GS route policy setting area 200a and in the BES route policy setting area 200b. Note that the sub-policy in the embodiment serves to establish detailed route selecting conditions in this policy when in a route selecting process based on the policy in the embodiment.

The policy setting screen 201 in FIG. 2 has a reallocation threshold value setting area 201a for setting a threshold value on the occasion of judging whether a route reallocation about the GS flow is conducted or not. Further, the policy setting screen 201 has a congestion judging threshold value setting area 201b for setting a threshold on the occasion of judging whether or not the congestion occurs on the route about the BES flow. Note that there will hereinafter be explained a judgment as to whether or not the reallocation related to the GS flow and the load on the route related to the BES flow are equal to or smaller than threshold values which are set in the reallocation threshold value setting area 201a and in the congestion judging threshold value setting area 201b.

To begin with, a route selection system and a link residual-bandwidth calculation system in the policy 1 and the policy 2 will be described in detail.

<Route Selection System>

As systems for determining a route between nodes residing in the network, there exist mainly three systems such as a minimum hop route selection system, a large bandwidth route selection system and a minimum bandwidth route selection system. In the embodiment, a proper route selection system is applied to each of GS flow processing and BES flow processing.

The minimum hop route selection system is a system for selecting a route containing a minimum number of hops across the two nodes. Generally, on the IP network at the present, the router autonomously calculates the shortest route. In the embodiment, in a case where this minimum hop route selection system is applied to the GS flow and to the BES flow, a packet forward delay in the network is shortened by selecting the route having the shortest distance with respect to every flow. In the embodiment, when the every flow flowing through each quality class has a strict condition of the delay about a higher-order application, it is possible to prevent deterioration of quality of the flow by use of this minimum hop route selection method.

The large bandwidth route selection system is a system for selecting such a route that a residual (available) bandwidth of the flow passing route is maximized. Note that the residual bandwidth of the route indicates a value deemed as a residual bandwidth of the route by executing some processing with respect to the residual bandwidth of each of cross-over links of the route. In the embodiment, for instance, an inverse number of the value of the residual bandwidth of the link is defined as a link's cost and added with respect to each of cross-over links. It can be said from this that a route having a smaller total value of the link's cost is a route having a larger residual bandwidth. Note that a concrete module acquiring such a route as to maximize the residual bandwidth can be exemplified by, for example, Dijkstra algorithm for calculating a minimum cost route.

In the embodiment, the large bandwidth route selection system is used for the GS flow, thereby selecting links having the bandwidths that are as residual as possible within the network. Therefore, in the embodiment, it is feasible to enhance the using efficiency of the bandwidth resource within the network. Further, in the embodiment, the large bandwidth route selection system for the BES flow, thereby selecting links having the bandwidths that are as residual as possible. Hence, in the embodiment, with an effect that the using efficiency of the bandwidth resource is enhanced, it is possible to reduce a probability of coming to the state of congestion also in the case of an abrupt increase in forwarding quantity of the BES flow.

The minimum bandwidth route selection system is a system for selecting such a route as to, on the contrary to the large bandwidth route selection system, minimize the residual bandwidth of the passing route. The residual bandwidth of the route indicates, similarly to the large bandwidth route selection system, a value deemed as a residual bandwidth of the route by executing some processing with respect to the residual bandwidth of each of cross-over links of the route. In the embodiment, for example, a value into which the values of the residual bandwidths are added up with respect to the cross-over links is set as a residual bandwidth of the route, whereby a route having the minimum total value can be obtained as a minimum residual bandwidth route. A concrete search means at this time can involve the use of the Dijkstra algorithm for calculating the minimum cost route similarly to the large bandwidth route selection system.

In the embodiment, the minimum bandwidth route selection system is used for the GS flow, thereby selecting the route from among the links each having the residual bandwidth that is as small as possible within the network. Therefore, there can remain as many residual bandwidths as possible with respect to the links other than the selected links. As a result, when there is a path set-up request about the quality guaranteed flow from the next time onwards, an effect of increasing a probability that the route is to be discovered even in the case of the requested bandwidth being large, can be expected. In a case here the bandwidth requested by a forwarding application is large, it is feasible to expect an effect of decreasing the call loss ratio by applying this minimum bandwidth route selection system.

In the embodiment, however, in the case of using the minimum bandwidth route selection system for the BES flow, the links having the residual bandwidths that are as small as possible within the links, are selected as a route, thereby leading to an easy-to-make prediction that there occurs the state of congestion also when the forwarding quantity of the BES flow abruptly rises. Accordingly, in the embodiment, the minimum bandwidth route selection system is not applied to the BES flow.

In the embodiment, the varieties of route selection methods are applied to the route selection for the GS flow and to the route selection for the BES flow that involves performing the dynamic load balancing. Further, considering that the minimum bandwidth route selection system is not applied to the BES flow, in the embodiment, the following route selection systems are to be carried out.

1. A system for applying the minimum hop route selection to the GS flow and to the BES flow
2. A system for applying the minimum hop route selection to the GS flow and applying the maximum bandwidth route selection to the BES flow
3. A system for applying the maximum bandwidth route selection to the GS flow and applying the minimum hop route selection to the BES flow
4. A system for applying the maximum bandwidth route selection to the GS flow and the BES flow
5. A system for applying the minimum bandwidth route selection to the GS flow and applying the minimum hop route selection to the BES flow
6. A system for applying the minimum bandwidth route selection to the GS flow and applying the maximum bandwidth route selection to the BES flow The following are explanations of these systems.

<Link Residual Bandwidth Calculation System in Route Selection for BES Flow>

In the embodiment, on the occasion of carrying out the route selections, the route is selected based on respective link residual bandwidths. At this time, in regards to setting these residual bandwidths, the calculations are made corresponding to traffic quantities of the GS flow and of the BES flow in the links. To begin with, a link residual bandwidth calculation method on the occasion of selecting a path for the BES flow, will be explained.

Figure 3:
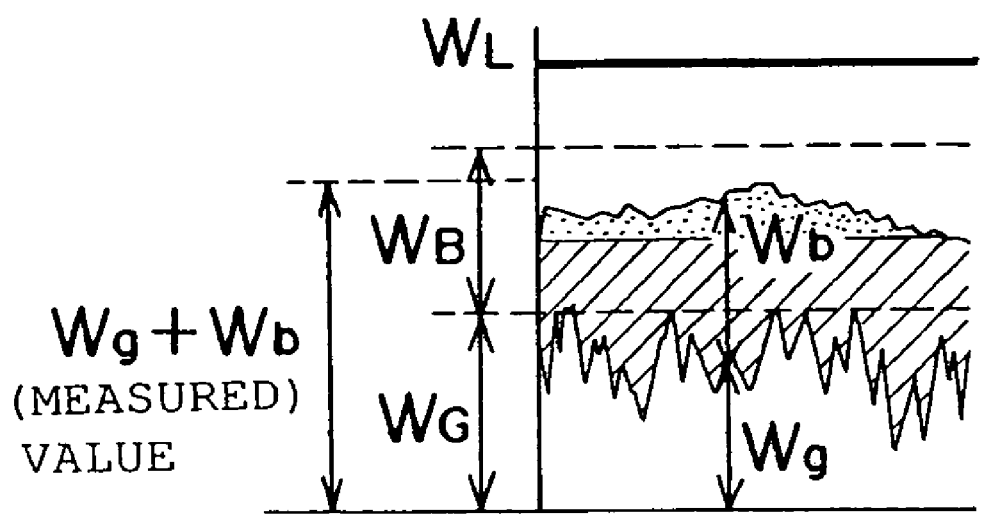
FIG. 3 shows a using state of a link bandwidth.

FIG. 3 represents a bandwidth using state in one link. In FIG. 3, WL shows a link's physical bandwidth. Further, WG indicates a total of already-reserved bandwidth for the GS flow. Then, WB represents a total of requested bandwidth for the BES flow. Moreover, Wg indicates an actual using bandwidth for the GS flow flowing through within the link. Still further, Wb shows an actual using bandwidth for the BES flow flowing through within the link.

In FIG. 3, the GS flows and the BES flow exist in mixture in the link. Therefore, on the occasion of thinking about the residual bandwidth for the BES flow, it is required that a GS flow-based traffic be considered. Accordingly, a residual bandwidth W for the BES flow is a value into which a quantity of the GS flow and a quantity of the BES flow are subtracted from the link bandwidth WL.

In this case, however, concerning the GS flow, generally the bandwidth declared by a user might be different from an actual bandwidth of the flow that actually flows, and hence there is a necessity of distinguishing between the values of these bandwidths. Further, concerning the BES flow also, though the user generally does not declare the bandwidth, there is considered a case where a network administrator or the like assigns a proper bandwidth (which is called a request bandwidth) corresponding to the application to be used. In this case, the actual using bandwidth and the request bandwidth are required to be considered in separation. Taking the above points into account, as the residual bandwidths usable for the BES flow, the following three types of formula are considered.

$$WL-(WG+WB) \quad (a)$$

$$WL-(WG+Wb) \quad (b)$$

$$WL-(Wg+Wb) \quad (c)$$

Herein, WL is a link's physical bandwidth (which will hereinafter be also referred to as a link bandwidth). Further, WG is a total of the already-reserved bandwidth for the GS flow. Then, WB is a total of the request bandwidth for the BES flow. Moreover, Wg is an actual using bandwidth for the GS flow that flows in the link. Yet further, Wb is an actual using bandwidth for the BES flow that flows in the link.

The formula (a) is what the total of the reserved bandwidth for the GS flow and the request bandwidth for the BES flow is subtracted from the link bandwidth. In the case of using the formula (a), there is considered a case in which the actual amount of flow reaches neither the reserved bandwidths nor the request bandwidths, however, bandwidths for that amount can be surely guaranteed in the embodiment.

The formula (b) is what the reserved bandwidths for the GS flow and the actual using bandwidths for the BES flow are subtracted from the link bandwidth. In the case of using the formula (b), an amount of the reserved bandwidths for the GS flow is surely guaranteed, while in connection with the BES flow the actual using bandwidths are to be considered. Accordingly, in the embodiment, it is possible to scheme to effectively utilize the bandwidths.

The formula (c) is what the actual using bandwidths for the GS flow and for the BES flow is subtracted from the link bandwidth. In the case of the formula (c), the residual bandwidth becomes what an actual link using condition at a certain point of time is reflected in. In this instance, when a total (Wg+Wb) of the actual using bandwidths is smaller than a total (WG+WB) of the reserved bandwidth for the GS flow and the request bandwidth for the BES flow, the residual bandwidth W becomes extremely large as compared with (a) and (b). Hence, in the embodiment, in the case of using the formula (c), the bandwidths can be effectively utilized.

Further, the way of thinking of the residual bandwidth that described above takes into consideration the value into which the bandwidths for the GS flow and for the BES flow are subtracted from the link's physical bandwidth. Other than this thinking way, in the embodiment, a ratio of the residual bandwidth to the link's physical bandwidth can be also utilized. Namely, (a) through (c) are divided by the link bandwidth, whereby values of the following formula (d) through (f) are utilized as residual bandwidths.

$$1-(WG+WB)/WL \quad (d)$$

$$1-(WG+Wb)/WL \quad (e)$$

$$1-(Wg+Wb)/WL \quad (f)$$

Moreover, in the embodiment, it is also considered not that the residual bandwidth is defined as a ratio of the bandwidth for each flow to the link's physical bandwidth but that it is used as a ratio of the bandwidth for the BES flow to a value into which the amount of the reserved bandwidth for the GS flow is subtracted from the link's physical bandwidth.

$$1-Wb/(WL-WG) \quad (g)$$

$$1-WB/(WL-WG) \quad (h)$$

In these formula (g) and (h), the reserved bandwidth for the GS flow is subtracted beforehand from the link's physical bandwidth, and hence in the embodiment the bandwidth for the amount of the GS flow can be surely guaranteed in advance.

<Link Residual Bandwidth Calculation System in Route Selection for GS Flow>

Next, a link residual bandwidth calculation method on the occasion of selecting a path for the GS flow, will be explained.

In the BES service, there is generally no declaration of the request bandwidth from the user. By contrast, it is considered in GS that there is the declaration of the bandwidth from the user. Accordingly, on the occasion of selecting the path, in order for a certain link to be selected as a route, it is required that there at first is a bandwidth equal to or larger than the request bandwidth with respect to at least the link.

For selecting the path on the network in a way that takes this into account, in the embodiment, in a case where a certain network topology is given, the path selection is made by choosing only the links having the residual bandwidths for GS that are equal to or larger than the request bandwidth with respect to the links on this topology.

Concretely, when making the path selection in the embodiment, on the occasion of performing the calculation using the existing Dijkstra algorithm, the topology is configured of only the links having their residual bandwidths for GS that are equal to or larger than the request bandwidth with respect to all the links of the network, and the calculation is performed. Further, in the embodiment, the path selection is made excluding the links exceeding the threshold value due to a flow of a large quantity of traffic for the BES service among the links having the residual bandwidths for GS that are equal to or larger than the request bandwidth. This enables, in the embodiment, the path for GS to be set, which does not affect the BES traffic.

Next, the residual bandwidth for the quality guaranteed service described above will be explained.

Figure 4:
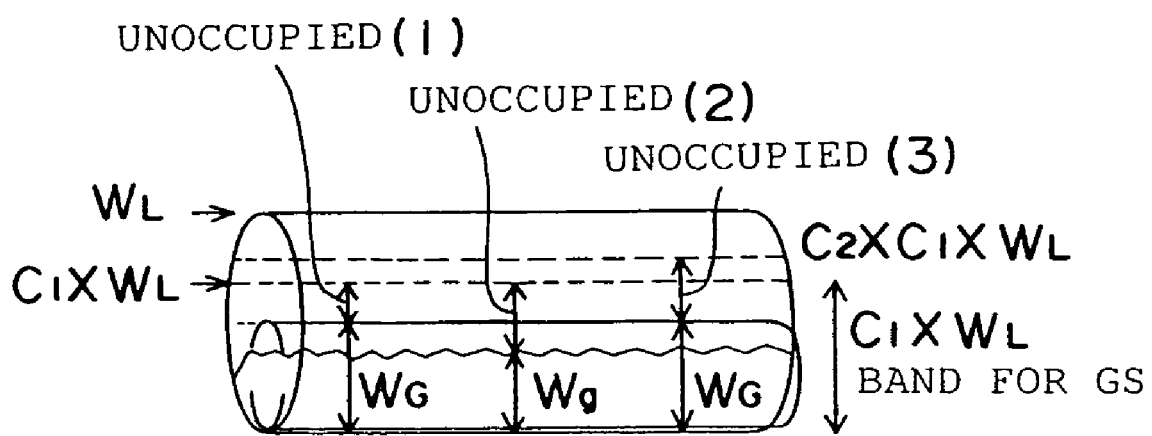
FIG. 4 shows a using state of a link bandwidth.

FIG. 4 illustrates a GS bandwidth using condition within one link. WL is a physical bandwidth of the link, WG is an already-reserved bandwidth for the quality guaranteed flow, and Wg is an actual using bandwidth for the GS flow that flows within the link.

In FIG. 4, C1 is a coefficient representing an occupying ratio of the GS flow in the link. For instance, in the case of defining that 80% of the link may be given to the GS flow, it becomes such as C1=0.8. From the above, a value that C1 can take is given by $0 < C1 \leq 1$. Further, the bandwidth that may be occupied by the GS flow is given such as C1×WL, however, as a matter of fact, a statistical multiplexing effect can be expected corresponding to a flow accommodation quantity. In face, the statistical multiplexing effect enables an acceptance of more GS requests than C1×WL. Accordingly, C2 is what represents a ratio of how much the requests are to be accepted. At this time, it becomes such as C2>1.

In the embodiment, supposing that the BES traffic quantity may not be considered as the residual bandwidth for GS is calculated, it is considered that the following three types are to be applied when methods of calculating the residual bandwidth usable for the GS flow.

(C1*WL)−WG  (i)

(C1*WL)−Wg  (j)

C2*(C1*WL)−WG  (k)

Herein, WL is a link's physical bandwidth. Further, WG is a total of the already-reserved bandwidth for the quality guaranteed flow. Then, Wg is an actual using bandwidth for the quality guaranteed flow that flows within the link. Moreover, C1 is a ratio at which the link can be used for GS. Yet further, C2 is a coefficient for taking the statistical multiplexing effect into consideration.

Note that the way of thinking of the residual bandwidth takes into consideration the value into which the Bandwidth for the GS flow is subtracted from the link's physical bandwidth, however, other than this thinking way, it is possible to utilize a ratio of the residual bandwidth to the link's physical bandwidth. Namely, in (i) through (k), WG or Wg is divided by a usable link bandwidth, whereby the following (l) through (n) are utilized as residual bandwidths.

1−WG/(C1*WL)  (l)

1−Wg/(C1*WL)  (m)

1−WG/(C2*C1*WL)  (n)

The formula (i) and (l) are each what the reserved bandwidth is subtracted from the link bandwidth usable for the GS flow, and a ratio thereof. Note that a case where the amount of the GS flow that actually flows might be less than the reserved bandwidth, is considered, however, the guaranty herein is that the request bandwidth be usable simultaneously for all the GS flows.

Moreover, the formula (j) and (m) are each what the actual using bandwidth for the GS flow is subtracted from the link bandwidth usable for the GS flow, and a ratio thereof. In the case of a flow that continues for a long period of time such as streaming, there is considered a possibility in which the user might temporarily halt the flow in the midst of the transmission. In such a case, the actual amount of GS flow is small for the reserved bandwidth, and hence the bandwidth to be used can not be effectively utilized. In this case, the residual bandwidths not in the formula (i) and (l) but in the formula (j) and (m), thereby enabling the actually-residual bandwidths to be effectively used.

The formula (k) and (n) are each a result of multiplying the link bandwidth usable for the GS flow by a coefficient making allowances for the statistical multiplexing effect and thereafter subtracting the reserved bandwidth for the GS flow therefrom, and a ratio thereof. It is feasible to respond to much more requests making allowances for the statistical multiplexing effect in GS by use of this residual bandwidth.

Further, in the formula (i) through (n), C1 is deemed not as a constant but as a variable, whereby a ratio of the link usable for the GS flow can be dynamically changed. At this time, for example, let n be the number of best effort flows, and let C1 be a n's function C1=f(n). When an average bandwidth per BES flow can be predicted, for instance, in the case of the network where a main application of BES can be specified, a bandwidth required for BES can be calculated from the number of BES flows and from characteristics of the application. Based on this, the ratio of the link usable for GS is increased or decreased, thereby enabling the traffic control taking the BES flow into consideration to some extent.

The use of the link residual bandwidth calculation system when selecting the BES flow/GS flow routes as described above, in the embodiment, makes it feasible to perform the route selection taking into account the quantity of the GS flow and the quantity of the BES flow, mutually.

In some of the systems for selecting the maximum bandwidth route for, e.g., BES flow, in the case of calculating the link residual bandwidth by way of the formula (a): WL−(WG+WB), the residual bandwidth is to be considered on the assumption that an amount of WG+WB is unusable even if the actual traffic quantity is small. Accordingly, the route to be searched for the BES flow is selected so as to pass across the link with less of the amount of reserved GS flow and to pass across the link with less of the BES flow requests. This results in an ever-made selection of the link where the congestion is hard to occur for the BES flow, and it is therefore possible to decrease the probability that the route selected afresh for the BES flow encounters the congestion.

Moreover, in the case of calculating the link residual bandwidth by way of the formula (c): WL−(Wg+Wb), the most-residual bandwidth is selected based on the actual using bandwidths for GS and for BES. Accordingly, in the embodiment, the operation having a high bandwidth using efficiency at all times become possible.

<Route Determining System in the Case of Plural (Multiple) Routes Being Discovered when Selecting Route>

Furthermore, in the embodiment, when selecting the route, there might be discovered a plurality of routes those are equal to each other in their, for instance, minimum hop count. The plurality of these routes might occur when the route calculation is performed on the Dijkstra calculation. Further, the discovery of the plural routes is the same with the maximum bandwidth route selection system and the minimum bandwidth route selection system as well. At this time, pluralities of selection systems (sub-policies) that follow are to be considered as to which route is selected from among the plurality of routes discovered. With respect to the BES flow, however, the system for selecting the minimum bandwidth route is not adopted.

(101): When the search for the minimum hop route system is applied to the GS flow or the BES flow, when the pluralities of routes are searched for, the maximum bandwidth route is selected therefrom.

(102): When the search for the minimum hop route system is applied to the GS flow, when the pluralities of routes are searched for, the minimum bandwidth route is selected therefrom.

(103): When the search for the maximum bandwidth route system is applied to the GS flow or the BES flow, when the pluralities of routes are searched for, the minimum hop route is selected therefrom.

(104): When the search for the minimum bandwidth route system is applied to the GS flow, when the pluralities of routes are searched for, the minimum hop route is selected therefrom.

The system in (101) involves, with respect to the GS flow, as described above, using the residual bandwidth taking allowances for a quantity of the intra-link BES flow by taking C1 small in the calculation of the residual bandwidth for GS. Then, the system in (101) selects the link containing, as much as possible, none of the BES flow. In this way, the system in (101) selects the route having a larger residual bandwidth, from among the plurality of routes. Accordingly, the system in (101) has an effect of reducing a probability that BES is to be discarded due to the GS flow. Further, the route having the residual bandwidth that is as large as possible is selected for the BES flow, thereby yielding an effect of decreasing a probability that the congestion occurs even in a case where the forwarding quantity of the BES flow rises.

Moreover, the system in (102) is that C1 in the calculation of the residual bandwidth for GS is taken large for the GS flow, whereby it follows that the residual bandwidth taking no allowance for the quantity of the intra-link BES flow, is to be used. Accordingly, in the system in (102), the route having the small residual bandwidth is selected from among the plurality of routes, thereby yielding an effect of packing the GS flow into a specified link. This prevents, in the system in (102), the BES flow in other link from undergoing an influence of the GS flow.

Moreover, concerning the systems in (103) and (104), the selection of the minimum hop route for both of the GS flow and the BES flow results in selecting the route that is short of delay for the GS flow. Hence, the systems in (103) and (104) are effective in the network wherein there flow many applications that are strict to the delay.

In the route selection systems, with respect to the selection system on the occasion of selecting a certain route and the selection system on the occasion of conducting the route selection next time, a different selection system can be used. For example, in regards to the GS flow and the BES flow, when a quantity of the intra-network traffic is small, the minimum hop route selection is made for both, whereby the route with forwarding delays that is as small as possible is to be used. When in the policy 1, there might be a case in which a traffic quantity into which the GS flow and the BES flow flowing through the shortest route are added up, or a traffic quantity of the BES flow flowing through the shortest route, exceeds a certain threshold value. In this case, a change to select the maximum bandwidth route as a route for load balancing for the BES flow is made, whereby the BES flow flowing through the minimum hop route can avoid being affected by the GS flow. Moreover, when in the policy 2, there might be a case in which the traffic quantity into which the GS flow and the BES flow flowing through the shortest route are added up, or the traffic quantity of the GS flow flowing through the shortest route, exceeds a certain threshold value. In this case, a change to select the maximum bandwidth route as a detour route for the GS flow is made, whereby the BES flow flowing through the minimum hop route can avoid being affected by the GS flow.

These residual bandwidth calculation and route selection process will be described in the following embodiment. In the embodiment, a network control device periodically collects pieces of link statistical information from the respective routers. Further, the network control device manages pieces of information on the respective link residual bandwidths for GS. Then, the network control device calculates the residual bandwidth on the basis of the link static information and the residual bandwidth information. Note that this residual bandwidth calculation is, to be specific, made in a route control unit in the network control device.

<Dynamic Load Balancing System for Flow in Policy 1>

Normally, the BES flow is low in its priority when forwarded as compared with the GS flow. Therefore, if the congestion occurs, the quality of the BES flow declines. Such being the case, in the policy 1, when the ratio of the actual using bandwidth to the link's physical bandwidth exceeds a certain threshold value, a part of the BES flow of a path including this link is shifted to a different path (detour route) selected. In the embodiment, this process is referred to as a dynamic load balancing system 1 for the flow in the policy 1. Owing to this dynamic load balancing system 1 for the flow in the policy 1, the decline of the quality of the BES flow can be avoided in the policy 1.

Further, in the dynamic load balancing system in the policy 1, instead of setting ratio of the actual using bandwidth, a predetermined threshold value may be set in the BES flow occupying ratio at which to occupy unreserved bandwidth for GS. In this case, the BES flow is shifted to the detour route in the case of exceeding the threshold value of the BES flow occupying ratio. This process is referred to as a dynamic load balancing system 2 for the flow in the policy 1. This makes it feasible to judge whether the BES flow is shifted or not, according to the BES traffic quantity compared with the GS traffic quantity.

Moreover, in the policy 1, the BES flow can be surely guaranteed by providing a threshold value in a ratio of the declaration bandwidth for BES that occupies the unreserved bandwidth for GS.

<Reallocation System for GS Flow in Policy 2>

Further, in the embodiment, when accepting a request for the GS flow, there is a case in which an optimal path is not necessarily ensured (a reallocation system 1 for the GS flow). For example, as already stated, when there exists a large quantity of BES flow that flows across the link, there is a case of preventing an extreme decline of the quality of the BES flow by hindering that link from being selected by generating a QoS path.

At this time, in a case wherein the BES flow in the link that could not be selected comes to an end and the link becomes usable, that link is used for the GS flow. Namely, it might be better to make a reallocation to a more optimal path for the GS flow. For instance, when accepting the GS request, there is made a selection from a topology in which to connect the link of which the residual bandwidth obtained by the calculation of the link's using bandwidth does not exceed the threshold value set for the BES using bandwidth and is equal to or larger than the request bandwidth (a reallocation system 2 for the GS flow). Moreover, when a path using ratio, i.e., a ratio at which the actual using bandwidths occupy the physical bandwidths in the whole links configuring the path is less than the fixed value, the reallocation of the GS flow to the optimal path is conducted by shifting the GS flow accommodated in a less optimal path, e.g., a path containing a larger hop count (a reallocation system 3 for the GS flow). This enables, in the embodiment, the GS flow to be in the optimal state at all times. Further, at this time, because of taking allowances for the quantity of the BES flow together with the reallocation of the GS flow, the reallocation of the GS flow becomes possible only in the case of causing no decline of the quality of the BES flow.

Moreover, in the case of being unable to ensure the optimal path when making the GS flow request, for instance, there might be considered a case in which the path having the least hop count has already accommodated the quality guaranteed flow up to an allowable quantity. At this time, the GS flow is accommodated in other path having a larger hop count. When the bandwidth ensured for GS accommodated in the optimal path is less than the threshold value, the GS flow is reallocated to an optimal path (a reallocation system 4 for the GS flow). Note that if there is no necessity of considering the BES flow in the embodiment, the GS flow can be brought into the optimal state by use of this system. Furthermore, in the embodiment, the bandwidth is ensured for the optimal path by using the actual using bandwidth, and nevertheless an actually-unused state of the bandwidth are avoided, thus enabling the optimal path to be effectively utilized (a reallocation system 5 for the GS flow).

Moreover, in the embodiment, when reallocating the GS flow, there is a case where the GS flow request bandwidth can not be ensured. At this time, pluralities of QoS paths have already existed in the network, and hence there are only the residual bandwidths less than the request bandwidth. Supposing that a total sum of the residual ranges be larger than the request bandwidth, the request bandwidth can be ensured by reallocating some of the GS flows (a reallocation system 6 for the GS flow). This enables, in the embodiment, an acceptance of the GS request judged to be normally unacceptable without performing a complicated calculation.

<Architecture of Network Control Device in the Embodiment>

Figure 5:
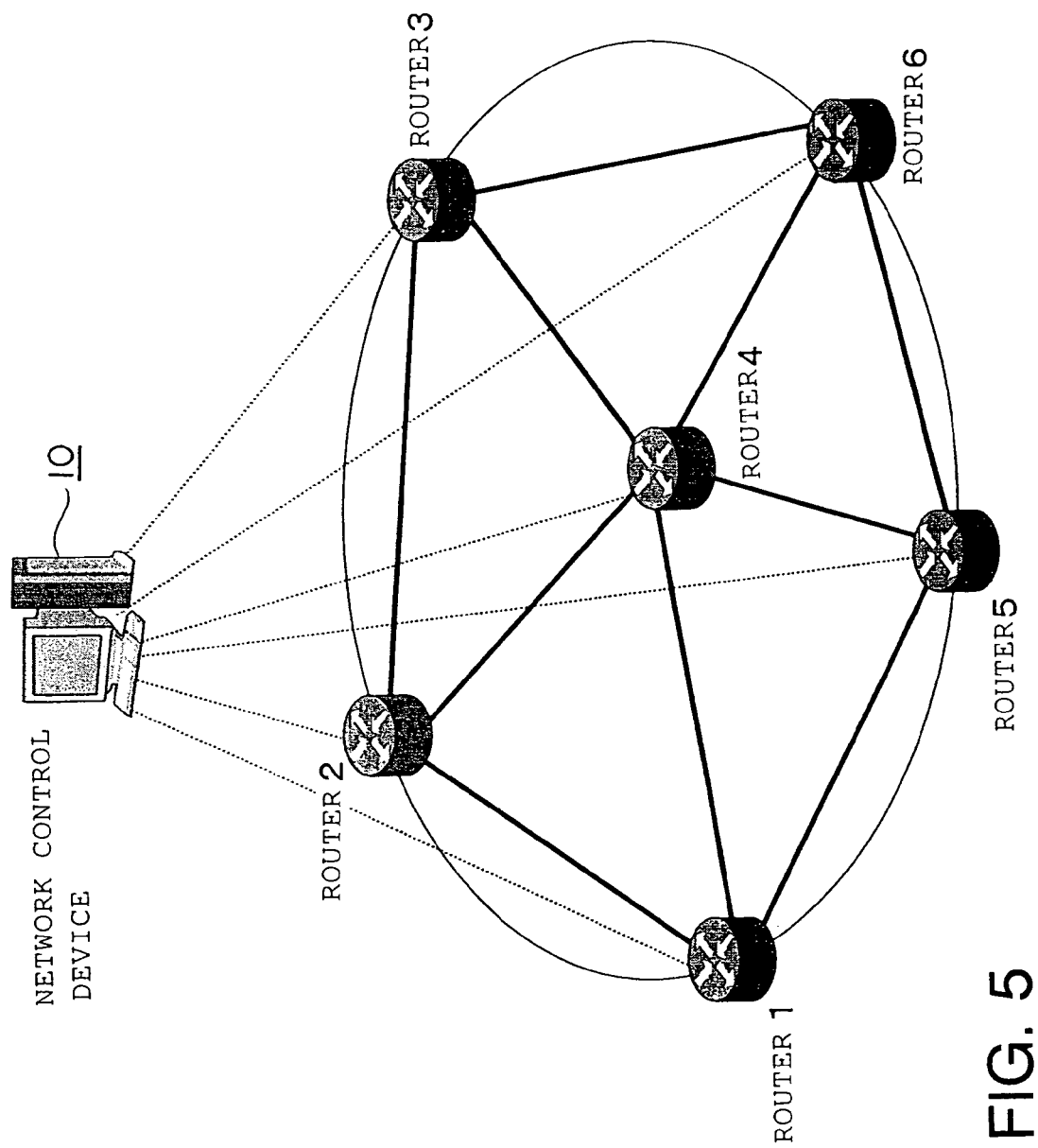
FIG. 5 shows a network architecture in an embodiment of the invention.

FIG. 5 shows network architecture in the case of embodying a transmission bandwidth control method of the invention by use of the network control device corresponding to a transmission bandwidth control device of the invention.

In FIG. 5, a network in the embodiment consists of routers 1, 2, 3, 4, 5, 6 capable of controlling a label path as by MPLS. Then, the respective routers 1, 2, 3, 4, 5, 6 are connected to a network control device 10. Note that settings of policies and sub-policies unified in all the routers shall be applied within the network in the embodiment.

Figure 6:
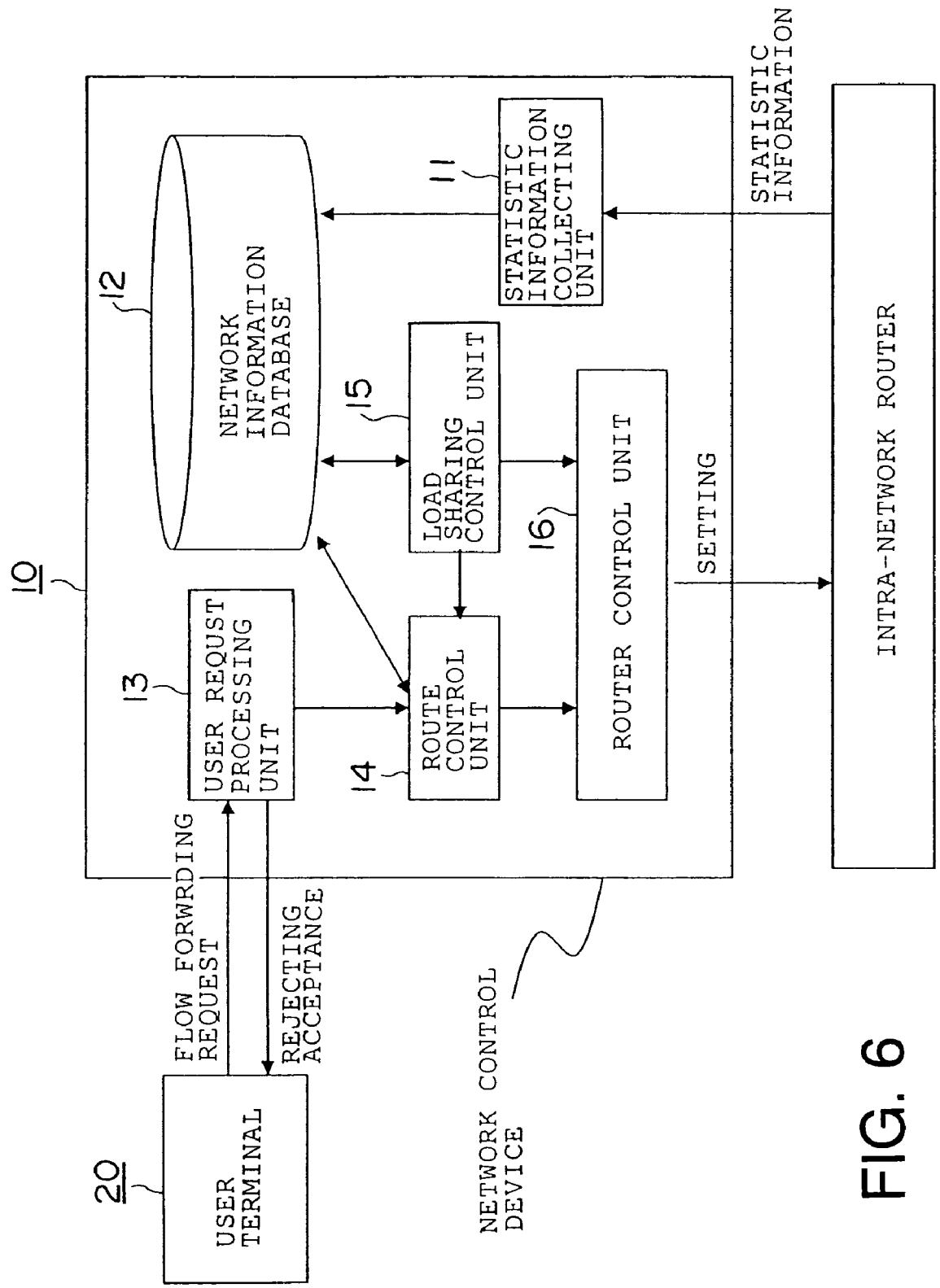
FIG. 6 shows a diagram of function blocks of a network control device.

FIG. 6 is a schematic diagram showing architecture of the network control device 10. The network control device 10 includes a statistical information collecting unit 11 for collecting pieces of statistical information about the bandwidths in a way that communicates with each of the routers in the network by utilizing a protocol such as SNMP (Simple Network Management Protocol), etc. Further, the network control device 10 includes a network information database 12 for storing the collected statistical information. Then, the network control device 10 includes a user request processing unit 13 for accepting and processing a flow forwarding request from a user terminal 20. Moreover, the network control device 10 includes a route control unit 14 for searching for such a route as to meet the request from the user terminal 20 by referring to the network information database 12, and thus generating route information. Then, the network control device 10 has a load balancing control unit 15 for executing a load balancing process of generating router setting information in a way that refers to the network information database 12 in order to effect the load balancing in such directions as to uniformise a network load. Moreover, the network control device 10 has a router control unit 16 for setting, in each router, the route information determined by the route control unit 14 and the router setting information determined by the load balancing control unit 15.

Next, functional explanations of respective function blocks within the network control device 10 will be given.

FIG. 7 shows an example of a structure of the network information database 12. The network information database 12 is stored with various pieces of setting information for every link (interface) of each router. Note that the link in the embodiment connotes a transmission path for establishing a terminal-to-terminal connection, a terminal-to-router connection, or a router-to-router connection.

To begin with, the network information database 12 is stored with IP addresses (self IP addresses) of the interfaces of the routers.

Further, the network information database 12 is stored with IP addresses of connecting destination interfaces. Then, the network information database 12 is stored with respective pieces of bandwidth information of the link's physical bandwidth (WL), the bandwidth reserved for the GS flow(WG), the bandwidth reserved for the BES flow(WB), the bandwidth actually used for the GS flow(Wg), and the bandwidth actually used for the BES flow(Wb).

Among the pieces of bandwidth information, with respect to the bandwidth (WG) reserved for the GS flow and the bandwidth (WB) reserved for the BES flow, on the occasion of respectively accepting the flow forwarding requests for GS and BES from the user terminals, the respectively ensured bandwidths are added up and thus held. Further, with respect to the bandwidth (Wg) actually used for the GS flow and the bandwidth (Wb) actually used for the BES flow, it is stored with values collected from the individual routers by the statistical information collecting unit at an interval of a predetermined period or at an interval of a predetermined time. Moreover, in regards to the IP addresses of the interfaces of the routers, the IP addresses of the connecting destination interfaces and the link's physical bandwidths (WL), the statistical information collecting unit collects them from the respective routers periodically or at a settled time. Note that the IP addresses of the interfaces of the routers, the IP addresses of the connecting destination interfaces and the link's physical bandwidths (WL) may be acquired beforehand as pieces of setting information from the outside and may also be retained on the network information database 12.

Still further, the network control device 10 in the embodiment includes the user request processing unit 13. This user processing unit 13 stores the network information database 12 with the request bandwidth for the BES and/or GS flow that has been accepted from the user terminal 20.

Through this user request processing unit 13, on the occasion of making a flow forwarding request, the user terminal 20 sides can notify the request processing unit of the network control device, of a quality guaranty request by use of an arbitrary protocol such as http (Hyper Text Transfer Protocol), etc. Considered as this quality guaranty request is means such as displaying a quality guaranteed service menu as a Web page provided by the network from on the network control device 19 and prompting the user terminal 20 side to select a service, and so forth. Moreover, for the quality guaranty request, there is given also a method of notifying the user terminal 20 side such as Parley or JAIN (Java in Advanced Intelligent Networks), etc. that uses a technology of OpenAPI (Application Programming Interface), or XML (Extensible Markup Language), etc.

FIG. 8 shows one example of a user request screen 100. This user request screen 100 is one example of a screen display on the occasion that the user terminal 20 side notifies the network control device 10 of a request for the bandwidth, etc. This user request screen 100 displays a request for receiving a steaming content from the side of the user terminal 20. At this time, the user terminal 20 side refers to the user request screen 10 and thus selects a sever for connection, a content for a receipt, a bandwidth representing a quality of a received image and whether there is the quality guaranty or not, respectively. Note that on this user request screen 100 the server for the connection may be selected not by the user terminal 20 side but by the network control device 10.

Figure 9:
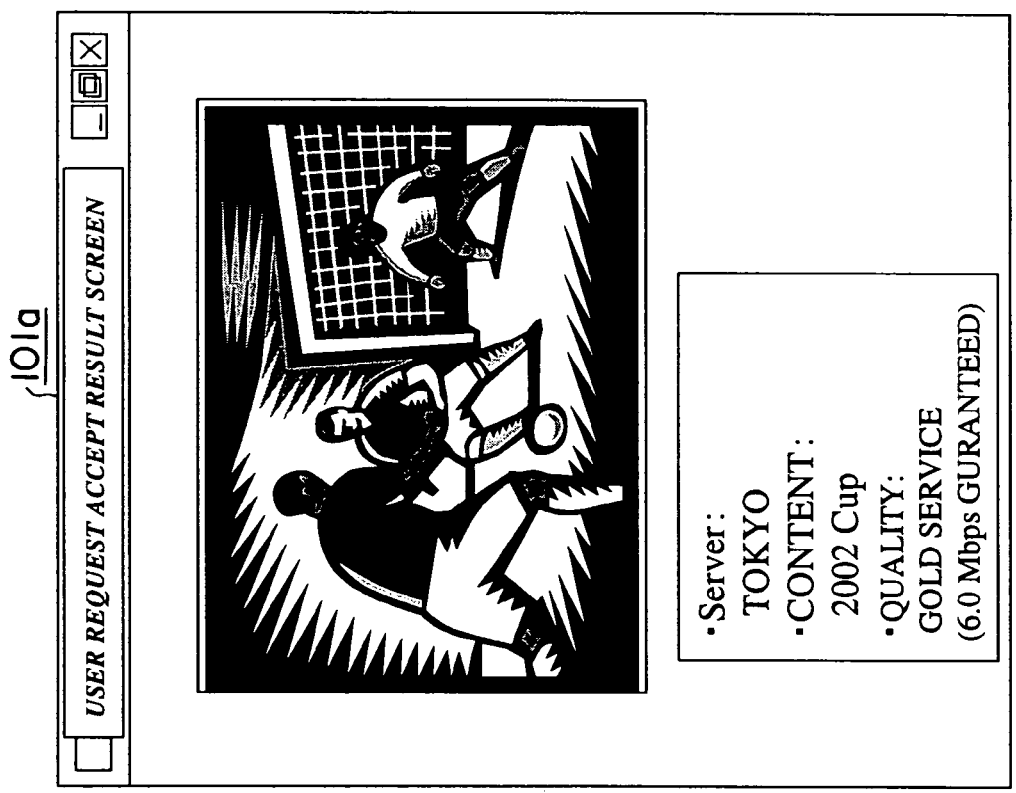
FIG. 9 shows an example of a user request accepts result screen (when accepted successfully)
Figure 10:
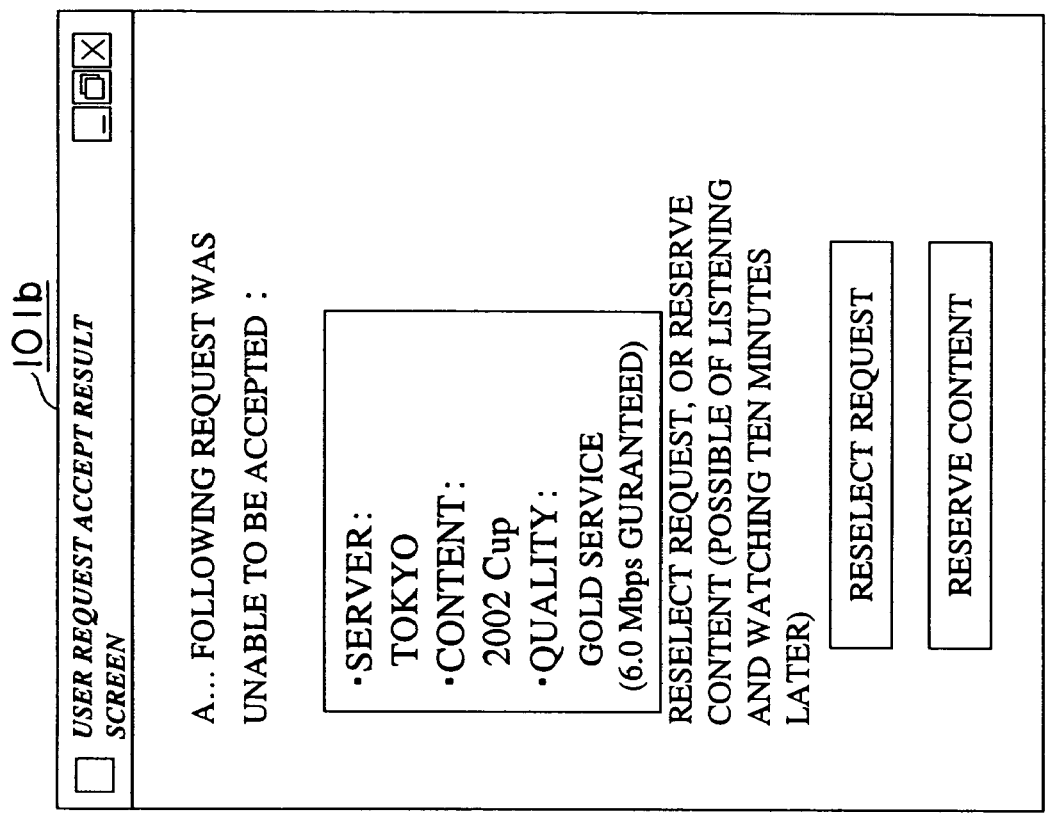
FIG. 10 shows an example of a user request accepts result screen (when rejecting acceptance)

FIGS. 9 and 10 are one example of an acceptance result screen showing that the network control device 10 accepted a user request on a user request screen 100a. FIG. 9 shows an acceptance result screen 101a when the network control device succeeds in the acceptance. This acceptance result screen 101a displays a case where the streaming content can be listened to and watched with a permission of the acceptance of the user request. Further, FIG. 10 is an acceptance result screen 101b. This acceptance result screen 101b displays a case where the network control device 10 rejects the acceptance of the user request. In this case, the user selects, on the acceptance result screen 101b, whether to make a request for other content or to reserve a receipt of the content on the basis of this request after an elapse of a predetermined time.

Figure 11:
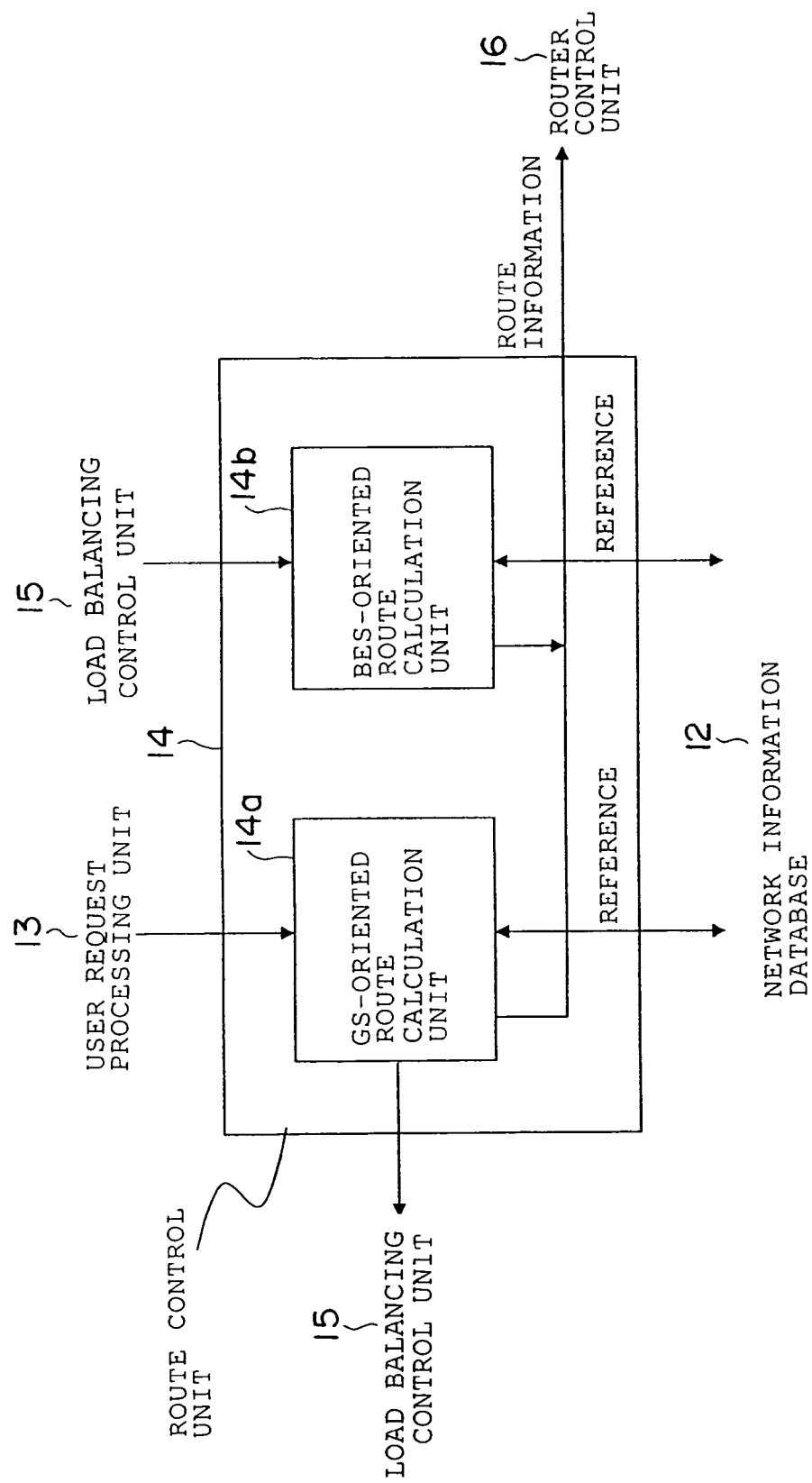
FIG. 11 shows a diagram of function blocks of a route control unit.

FIG. 11 is a function block diagram of the route control unit 14. The route control unit 14 searches for a route on the basis of the unillustrated traffic state information collected by the network control device 10 and the request bandwidth information stored on the network information database 12 by the user request processing unit 13. Note that the route search by the route control unit 14 involves the use of the Dijkstra algorithm, however, a variety of combinations about the route selection methods for the GS flow and the BES flow can be considered corresponding to how the flow is dealt with. Therefore, the route control unit 14 includes, as shown in FIG. 11, a route calculation unit 14a for GS and a route calculation unit 14b for BES.

To start with, the route setting in the policy 1 will be explained.

In the policy 1, in the search for the route for the GS flow, the route calculation unit 14a for GS, when accepting a new user request, the route calculation unit 14a for GS performs the path search according to any one of the following sub-policy 1 through sub-policy 7. Note that the sub-policy in the embodiment, when in the route selection process based on the policy in the embodiment, serves to settle detailed route selection conditions in this policy.

In the route selection for the GS flow, a route to minimize a cross-over hop count between an ingress node and an egress node of the network, is selected (the sub-policy 1).

In the route selection for the GS flow, a route having the largest residual bandwidth between the ingress node and the egress node of the network, is selected (the sub-policy 2).

In the route selection for the GS flow, a route to minimize the residual bandwidth between the ingress node and the egress node of the network, is selected (the sub-policy 3).

In the route selection for the GS flow, when there exist a plurality of routes to minimize the cross-over hop count between the ingress node and the egress node of the network, a route having the largest residual bandwidth between the ingress node and the egress node of the network, is selected (the sub-policy 4).

In the route selection for the GS flow, when there exist a plurality of routes to minimize the cross-over hop count between the ingress node and the egress node of the network, a route having the smallest residual bandwidth between the ingress node and the egress node of the network, is selected (the sub-policy 5).

In the route selection for the GS flow, when there exist a plurality of routes having the largest residual bandwidth between the ingress node and the egress node of the network, a route to minimize the cross-over hop count between the ingress node and the egress node of the network, is selected (the sub-policy 6).

In the route selection for the GS flow, when there exist a plurality of routes having the smallest residual bandwidth between the ingress node and the egress node of the network, a route to minimize the cross-over hop count between the ingress node and the egress node of the network, is selected (the sub-policy 7).

Further, the route calculation unit 14a for GS effects the path search in the network topology determined by a sub-policy 8 and a sub-policy 9 that follow.

When accepting the GS flow request, a route is selected from the topology taking allowances for only a link of which a link's residual bandwidth is equal to or larger than the request bandwidth, is determined (the sub-policy 8).

When accepting the GS flow request, there is made a selection from the topology in which to connect the link of which a using bandwidth for BES flow does not exceed the set threshold value and of which a residual bandwidth acquired by calculating the link's using bandwidth is equal to or larger than the request bandwidth (the sub-policy 9).

Next, the route setting in the policy 2 will be described.

The route calculation unit 14b for BES searches for a path for the BES flow. In the search for the default path for the BES flow, any one threshold value among a threshold value 1 through a threshold value 3 that follow is determined in the congestion judging threshold value setting area 201b on the policy setting screen 201 in FIG. 2. Then, in the case of setting a detour route due to an excess over this threshold value, a search for a path in the entire network topology is made according to any one sub-policy among the following sub-policies 10 through 15.

A threshold value is set in a path using ratio (a maximum value in the ratio of the actual using bandwidth to the physical bandwidth of the link configuring the path), in the case of exceeding the threshold value, a shift to a detour route for the BES flow is carried out (a threshold value 1).

A threshold value is set in a ratio of the actual using bandwidth for the BES service that occupies a bandwidth from which to subtract the bandwidth ensured for GS in the path(a maximum value in the ratio of the actual using bandwidth for the BES service to a bandwidth not ensured for GS in the physical bandwidth of the link configuring the path), and, in the case of exceeding the threshold value, a shift of the BES flow to the detour route is carried out (a threshold value 2).

A using bandwidth is declared when making a BES service request, whereby a threshold value is set in a ratio at which the declared using bandwidth for the BES service occupies a bandwidth from which to subtract the bandwidth ensured for GS in the path (a maximum value in a ratio of the declared using bandwidth for the BES service to the bandwidth not ensured for GS in the physical bandwidth of the link configuring the path), and, in the case of exceeding the threshold value, a shift of the BES flow to the detour route is performed (a threshold value 3).

In the route selection for the BES flow, a route to minimize the cross-over hop count between the ingress node and then egress node of the network, is selected (the sub-policy 10).

In the route selection for the BES flow, a route having the largest residual bandwidth between the ingress node and the egress node of the network, is selected (the sub-policy 11).

In the route selection for the BES flow, when there exist a plurality of routes to minimize the cross-over hop count between the ingress node and the egress node of the network, a route having the largest residual bandwidth between the ingress node and the egress node of the network, is selected (the sub-policy 12).

In the route selection for the BES flow, when there exist a plurality of routes to minimize the cross-over hop count between the ingress node and the egress node of the network, a route having the smallest residual bandwidth between the ingress node and the egress node of the network, is selected (the sub-policy 13).

In the route selection for the BES, when there exist a plurality of routes having the largest residual bandwidth between the ingress node and the egress node of the network, a route to minimize the cross-over hop count therein between the ingress node and the egress node of the network, is selected (the sub-policy 14).

In the route selection for the BES, when there exist a plurality of routes having the smallest residual bandwidth between the ingress node and the egress node of the network, a route to minimize the cross-over hop count therein between the ingress node and the egress node of the network, is selected (the sub-policy 15).

Further, in the policy 2, in the search for the path for the GS flow, when there does not exist any path for accommodating when accepting a new user request, the path search in the network topology that is determined by the sub-policy 26 or the sub-policy 27 is performed according to any one sub-policy among the sub-policies 16 through 25. Moreover, in the search for the path for the BES flow, in the case of setting a default path, the path search in the entire network topology is conducted in accordance with any one sub-policy among the sub-policies 16 through 25.

In the route selection for the GS flow, a route to minimize the cross-over hop count between the ingress node and the egress node of the network, is selected, and in the route selection for the BES flow, a route to minimize the cross-over hop count between the ingress node and the egress node of the network, is selected (the sub-policy 16).

In the route selection for the GS flow, a route to minimize the cross-over hop count between the ingress node and the egress node of the network, is selected, and in the route selection for the BES flow, a route to maximize the residual bandwidth between the ingress node and the egress node of the network, is selected (the sub-policy 17).

In the route selection for the GS flow, a route to maximize the residual bandwidth between the ingress node and the egress node of the network, is selected, and in the route selection for the BES flow, a route to minimize the cross-over hop count between the ingress node and the egress node of the network, is selected (the sub-policy 18).

In the route selection for the GS flow, a route to maximize the residual bandwidth between the ingress node and the egress node of the network, is selected, and in the route selection for the BES flow, a route to maximize the residual bandwidth between the ingress node and the egress node of the network, is selected (the sub-policy 19).

In the route selection for the GS flow, a route to minimize the residual bandwidth between the ingress node and the egress node of the network, is selected, and in the route selection for the BES flow, a route to minimize the cross-over hop count between the ingress node and the egress node of the network, is selected (the sub-policy 20).

In the route selection for the GS flow, a route to minimize the residual bandwidth between the ingress node and the egress node of the network, is selected, and in the route selection for the BES flow, a route to maximize the residual bandwidth between the ingress node and the egress node of the network, is selected (the sub-policy 21).

In the route selections for the GS flow and for the BES flow, when there exist a plurality of routes to minimize the cross-over hop count between the ingress node and the egress node of the network, a route having the largest residual bandwidth therein between the ingress node and the egress node of the network, is selected (the sub-policy 22).

In the route selections for the GS flow and for the BES flow, when there exist a plurality of routes to minimize the cross-over hop count between the ingress node and the egress node of the network, a route having the smallest residual bandwidth therein between the ingress node and the egress node of the network, is selected (the sub-policy 23).

In the route selections for the GS flow and for the BES flow, when there exist a plurality of routes having the largest residual bandwidth between the ingress node and the egress node of the network, a route to minimize the cross-over hop count therein between the ingress node and the egress node of the network, is selected (the sub-policy 24).

In the route selections for the GS flow and for the BES flow, when there exist a plurality of routes having the smallest residual bandwidth between the ingress node and the egress node of the network, a route to minimize the cross-over hop count therein between the ingress node and the egress node of the network, is selected (the sub-policy 25).

When accepting the request for GS, a route is determined from the topology taking allowances for only a link of which a link's residual bandwidth is equal to or larger than the request bandwidth and for only a link wherein a ratio at which the quality non-guaranteed traffic occupies the link does not exceed the set threshold value, and, when accepting the BES service request, a route is determined from the topology taking allowances for all the links (the sub-policy 26).

When accepting the request for GS, there is made a selection from the topology in which to connect the link of which a using bandwidth for the BES service does not exceed the set threshold value and of which a residual bandwidth acquired by calculating the link's using bandwidth is equal to or larger than the request bandwidth (the sub-policy 27).

Note that in the embodiment, the route searching methods for GS and for BES can involve using, as already stated, (A) the minimum hop route selection system, (B) the maximum bandwidth route selection system, and (C) the minimum bandwidth route selection system. Moreover, in the embodiment, a proper cost based on the Dijkstra calculation is used for any methods, whereby the route calculation can be done.

Figure 12:
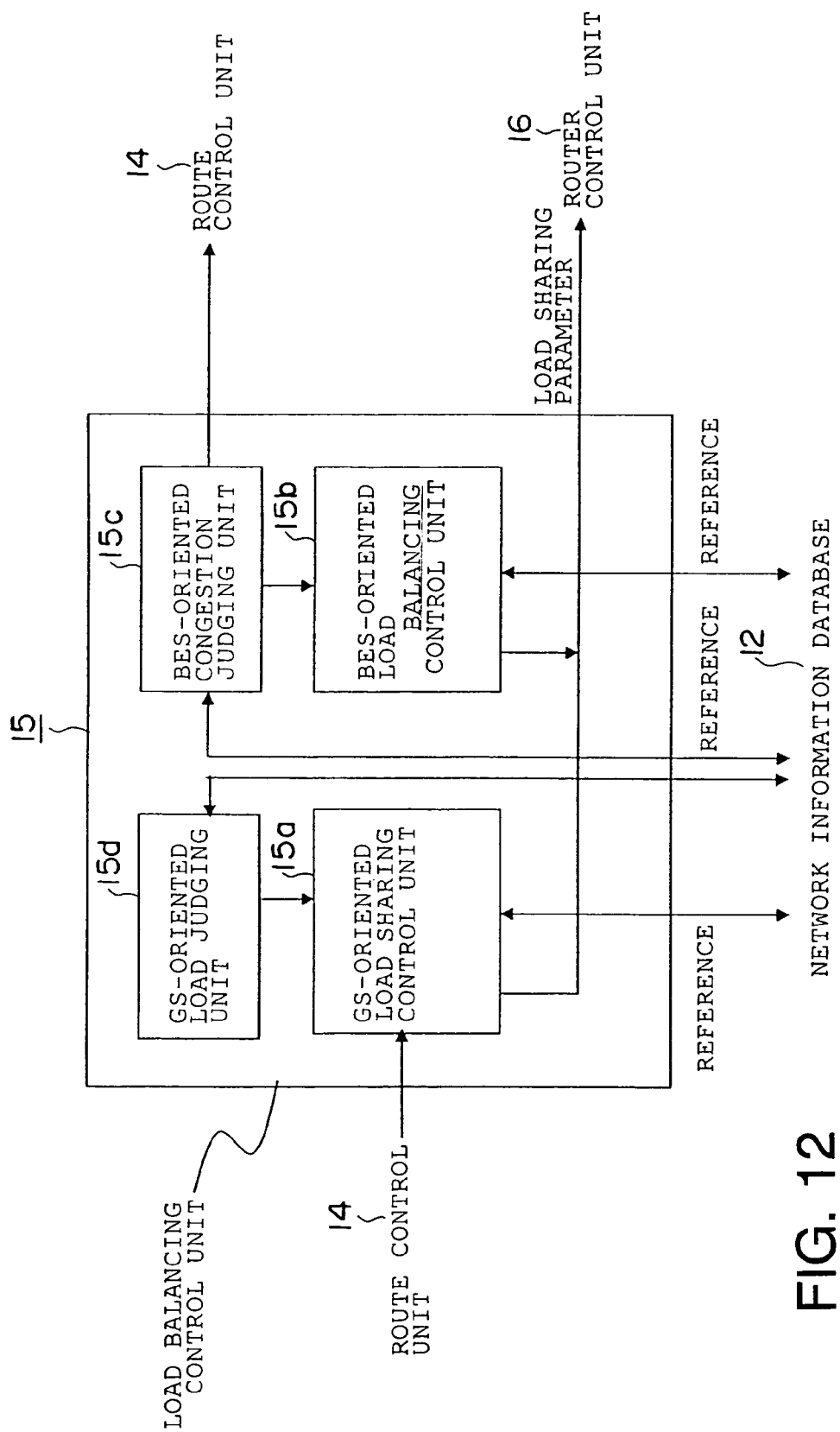
FIG. 12 shows a diagram of function blocks of a load balancing control unit.

FIG. 12 is a function block diagram of the load balancing control unit 15 of the network control device 10. The load balancing control unit 15 calculates allocations of individual flows to the plurality of routes. At this time, the load balancing control unit 15 calculates a load balancing process on the basis of the statistical information collected by the network control device 10 or the request bandwidth information stored on the network information database 12 by the user request processing unit 13.

To begin with, in the policy 1, the load balancing control unit 15 calculates a load state of the path set within the network at the present, and judges whether or not the load state of the path comes to a state of congestion. Simultaneously, the load balancing control unit 15 calculates a balancing ratio of the BES flow between the routes.

Moreover, in the policy 2, a load state of the path for GS is calculated, and it is judged whether or not the GS flow is to be shifted between the paths in accordance with the state, or a balancing ratio between the paths is calculated.

As shown in FIG. 12, for actualizing the processes in the policy 1 and in the policy 2, the load balancing control unit 15 includes a load balancing control unit 15a for GS and a load balancing control unit 15b for BES. Further, the load balancing control unit 15 includes a BES-oriented load judging unit 15d for the path about the BES flow. Furthermore, the load balancing control unit 15 includes a GS-oriented congestion judging unit 15c for the path about the GS flow.

In the policy 1, the BES-oriented congestion judging unit 15c judges a state when a load of the path for BES occurs. This BES-oriented congestion judging unit 15c, in the case of judging that the congestion occurs, notifies the route control unit 14 of its being congestion. With this, the BES-oriented congestion judging unit 15c gives an instruction to the route control unit 14 to search for a detour route for the load balancing.

In the policy 2, the load judging unit 15d judges a state when the load of the path for GS occurs. This load judging unit 15d, in the case of judging that it is equal to or smaller than the threshold value, notifies the GS-oriented load balancing control unit 15a of this purport. Then, the GS-oriented load balancing control unit 15a, in the case of judging that there is a flow accommodated in a path less optimal than the residual path and this flow can be shifted to the residual path, notifies a router of a parameter for indicating the load balancing.

Methods of calculating and judging the load state of the BES path can be carried out by use of the existing execution load calculating and judging methods. Moreover, the BES-oriented load balancing control unit 15b calculates a BES flow forwarding ratio between the paths with which the load is shared. Note that a method of calculating this BES flow forwarding ratio can involve utilizing the existing system, and therefore its detailed explanation is omitted.

In the policy 2, as already stated, when the path using ratio is less than the fixed value, the GS-oriented load balancing control unit 15a executes the process such as judging where the GS flow accommodated in the less optimal path, e.g., the path having the larger hop count is shifted, or calculating the forwarding ratio of the GS flow to be shifted to the optimal path. Then, the GS-oriented load balancing control unit 15a notifies the router control unit 16 of a result of the load balancing process. Furthermore, the GS-oriented load balancing control unit 15a similarly executes judging processes 1 through 4 following.

In the path, a threshold value is set in the bandwidth ensured for GS, when there is a residual bandwidth accommodating the GS flow when less than the threshold value and there exists other non-optimal path, the GS flow is shifted to an optimal path (the judging process 1).

In the path, a threshold value is set in a ratio at which the bandwidth ensured for GS occupies a utilizable bandwidth for the GS flow service, when there is a residual bandwidth accommodating the GS flow when this ratio is less than the threshold value and there exists other non-optimal path, the GS flow is shifted to an optimal path (the judging process 2).

In the path, a threshold value is set in an actual using bandwidth for GS, when there is a residual bandwidth accommodating the GS flow when this actual using bandwidth is less than the threshold value and there exists other non-optimal path, the GS flow is shifted to an optimal path (the judging process 3).

In the path, a threshold value is set in a ratio at which the actual using bandwidth for GS occupies a utilizable bandwidth for GS, when there is a residual bandwidth accommodating the GS flow when this ratio is less than the threshold value and there exists other non-optimal path, the GS flow is shifted to an optimal path (the judging process 4).

Note that in a case where the network control device 10 executes the processes in the policy 1, it is assumed that the BES-oriented load balancing control unit 15b and the BES-oriented congestion judging unit 15c be included in the network control device 10. Further, in a case where the network control device 10 executes the processes in the policy 2, it is assumed that the GS-oriented load balancing control unit 15a be included in the network control device 10.

The router control unit 16 receives the route information about the route for GS or the route for BES that has been calculated by the route control unit 14. Then, based on the route information, the route control unit 14 indicates the router in the network to set a path. Herein, the route information connotes information on addresses for identifying the routers passing though the calculated route. An ingress node of the route on the network is notified of these addresses for the identifications and is thereby capable of carrying out the set-up of the path by use of, e.g., the RSVP (Resource Reservation Protocol) defined as an MPLS signaling protocol. Moreover, the router control unit 16 receives, through the load balancing control unit 15, forwarding ratio information about the BES flow from the BES-oriented load balancing control unit 15b or forwarding ratio information about the GS flow from the GS-oriented load balancing control unit 15a, and sets the information in the routers on the network. The forwarding ratio information about these flows corresponds to, for instance, traffic balancing values. Moreover, a protocol for notifying the router involves utilizing a variety of protocols such as SNMP (Simple Network Management Protocol, COPS (Common Open Policy Service), or CLI (command Line Interface) and so on, thereby enabling the actualization thereof.

The statistical information collecting unit 11 accesses each of the routers within the network at the interval of the predetermined period or the predetermined time. At this time, the statistical information collecting unit 11 acquires the information retained by the routers for the bandwidth (Wg) actually used for the GS flow and for the bandwidth (Wb) actually used for the BES flow. Moreover, the statistical information collecting unit 11 acquires also IP addresses of interfaces of the routers, IP addresses of connecting destination interfaces and a link's physical bandwidth (WL). The protocols such as SNMP and CLI or COPS, etc. are used for forwarding the information between the statistical information collecting unit and the respective routers.

<Processing Flowcharts>

Next, flowcharts of processing in the network control device 10 on the occasion of carrying out the embodiment, will be explained. The processing in this network control device 10 is divided into the following four processes.

To begin with, the network control device 10, in the policy 1 and the policy 2, accepts a user's flow request, searches for a route that meets a requested quality and sets up a path. This process is named a route searching process by the network control device 10.

Further, the network control device 10, in the policy 1 and the policy 2, monitors a load state of the path for BES that is set in the network at the present, sets up the path by searching for a detour route for load balancing when a congestion occurs, and further executes a load balancing process between the plurality of routes. This process is named a load balancing process for BES by the network control device 10.

Still further, the network control device 10, in the policy 1 and the policy 2, monitors a load state of the path for GS that is set in the network at the present, judges whether or not the flow can be shifted to between different GS paths in accordance with the load state, and executes a load balancing process for the GS flow. This process is named a load balancing process for GS by the network control device 10.

Moreover, the network control device 10 periodically collects pieces of statistical information about the intra-network links, which are retained on the routers, stores them on the network information database, and further, in the case of accepting a flow forwarding request from the user and setting up the path, or in the case of allocating it to the already set-up path, stores the network information database with the set bandwidth information. This process is named a network information database updating process by the network control device 10.

Figure 13:
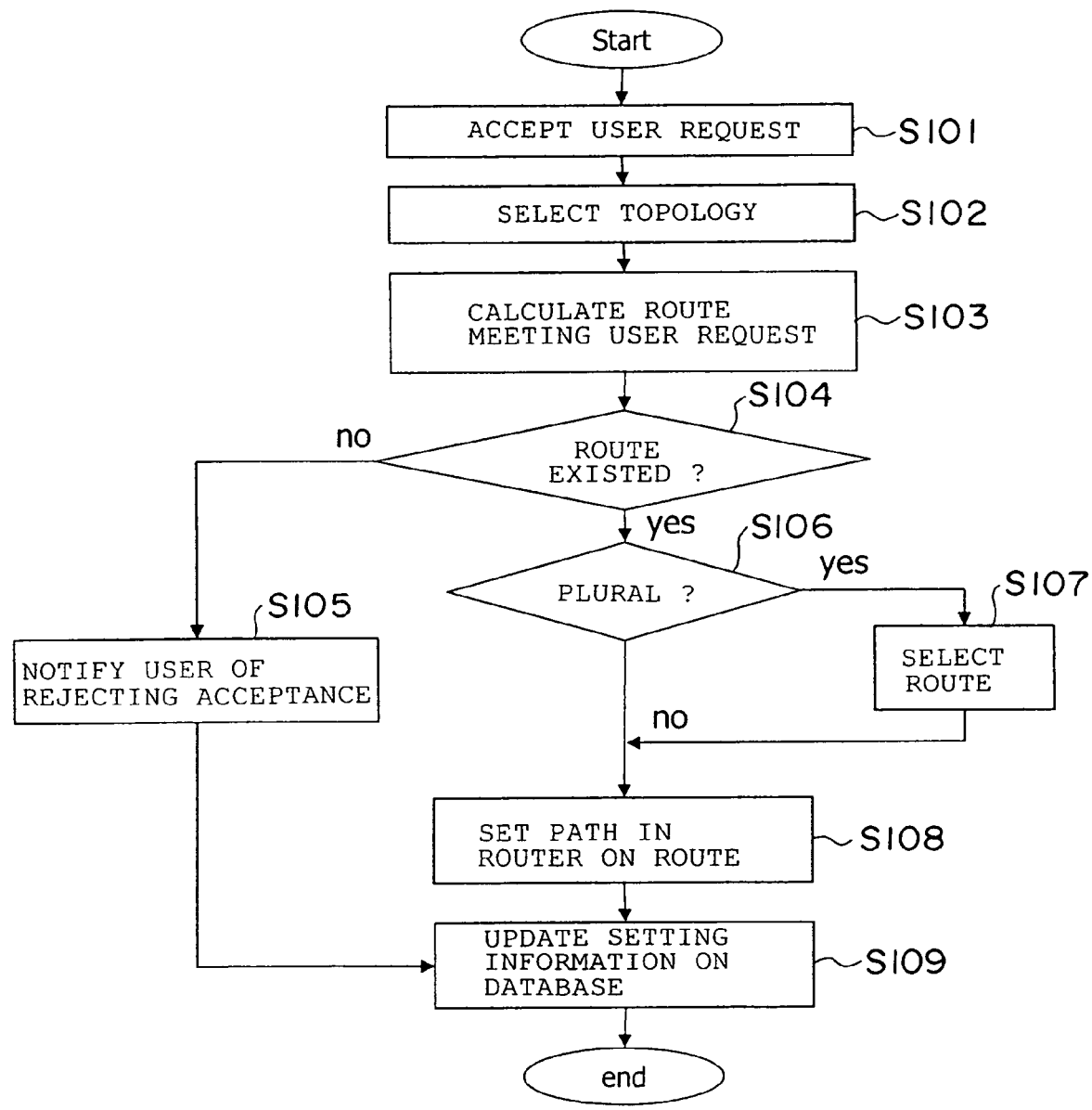
FIG. 13 shows a route search processing flow for GS.

FIG. 13 shows a processing flowchart of the route searching process for the GS flow. The user request processing unit 13 of the network control device 10 accepts a forwarding request of the GS flow having a certain quality from the user (S101).

Next, the user request processing unit 13 selects a topology corresponding to the user request (S102).

Note that the selection of the topology in the embodiment is made as follows.

Figure 28:
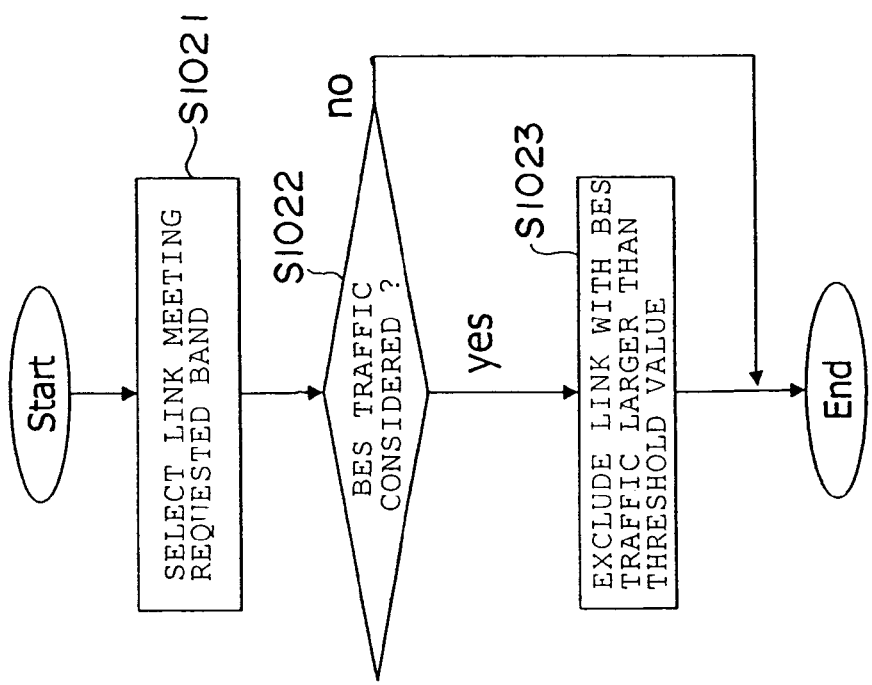
FIG. 28 shows a topology selection flow when calculating a GS route.

FIG. 28 is an explanatory flowchart of how the topology is selected in the embodiment. To start with, the user request processing unit 13 selects a link that meets the requested bandwidth (S1021).

Then, the user request processing unit 13 judges whether the BES traffic is taken into consideration or not (S1022), terminates this process in the case of taking it into no consideration, and returns to the route searching process for the GS flow. Further, the user request processing unit 13, in the case of judging that the BES traffic is taken into account in S1022, excludes a link in which the BES traffic is larger than the threshold value (S1023). The user request processing unit 13, after executing S1023, terminates this process and returns the route searching process for the GS flow.

Thereafter, the user request processing unit 13, for judging whether there is a route that meets a quality thereof or not, transfers a parameter showing the quality that should be met to the GS-oriented route calculation unit 14*a* of the route control unit 14, and thus gives an instruction of the calculation of the route that meets the user's request quality (S103). It is noted that, in this case, the user request processing unit 13 may exclude a link having a small residual bandwidth in advance of the request quality.

The route calculation unit 14 for GS executes the searching process as to whether or not there is the route that meets the quality with respect to the notified quality parameter (S104). This searching process uses pieces of link statistical information such as a link using ratio, a link bandwidth reservation value, a link delay, etc., which are stored on the statistical information database. Then, the route search is carried out based on the link statistical information by use of the Dijkstra algorithm as already stated, and pieces of information about the routers on the discovered route are outputted as route information. In a case where the route that meets the user request is discovered as a result of the route search by the route control unit 14, the route information is transferred to the router control unit 16.

While on the other hand, in a case where the route that meets the user request is not discovered as the result of the route search by the route control unit 14, the route control unit 14 notifies the user request processing unit 13 that the route search resulted in being unsuccessful for the user request processing unit 13 (S105). Then, the user request processing unit 13 notifies the user terminal that the acceptance was rejected. After notifying that the user terminal of the rejection of the acceptance, the network control device 10 moves to a process in S109.

In S104, when there is to be the route that meets the user request, the route control unit 14 judges whether there are a plurality of these routes or not (S106). In the case of judging in this step 106 that there are not the plurality of routes that meet the user request, the route control unit 14 advances to a process in S108.

Further, in S106, when the route control unit 14 deems that there are the pluralities of routes, the route selection is conducted (S107). At this time, the route control unit 14 selects the route in accordance with, for instance, the sub-policy in the embodiment.

The route control unit 14 transfers information on the selected route to the router control unit 16. The router control unit 16 having received the route information gives an instruction of setting up the path on the route (S108). Simultaneously, the route control unit 14 notifies the user request processing unit that the route search has been successful, and updates the bandwidth reservation value, etc. with respect to each of the links on the set route on the network information database 12 (S109). The user request processing unit 13 notifies the user terminal that the set-up of the path has been completed.

Figure 14:
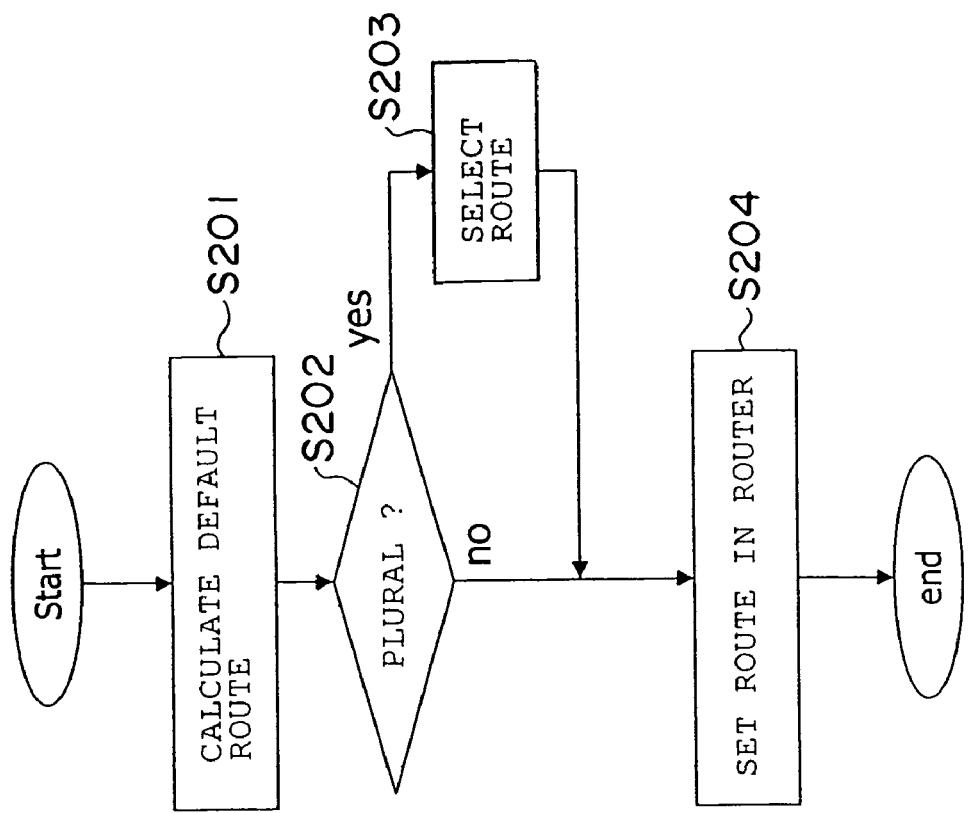
FIG. 14 shows a default route setting processing flow for BES.

FIG. 14 shows a flowchart of a default route set-up process for BES. Note this default route set-up process for BES is executed together with a route set-up process for GS. At first, the BES-oriented route calculation unit 14*b* performs a BES flow default route calculation (S201).

The BES-oriented route calculation unit 14*b* judges whether or not there are a plurality of routes derived from a result of the search (S202). Then, the BES-oriented route calculation unit 14*b*, when there are the plurality of routes, makes the route selection (S203). At this time, the BES-oriented route calculation unit 14*b* conducts the route selection according to, for example, the route selection systems 1 through 6 in the embodiment.

The BES-oriented route calculation unit 14*b* transfers information on the selected route to the router control unit 16.

The router control unit 16 having received the route information gives an instruction of setting up the path on the route. Simultaneously, the route control unit 14 updates the bandwidth reservation value, etc. with respect to each of the links on the set route on the network information database 12 (S204).

Figure 15:
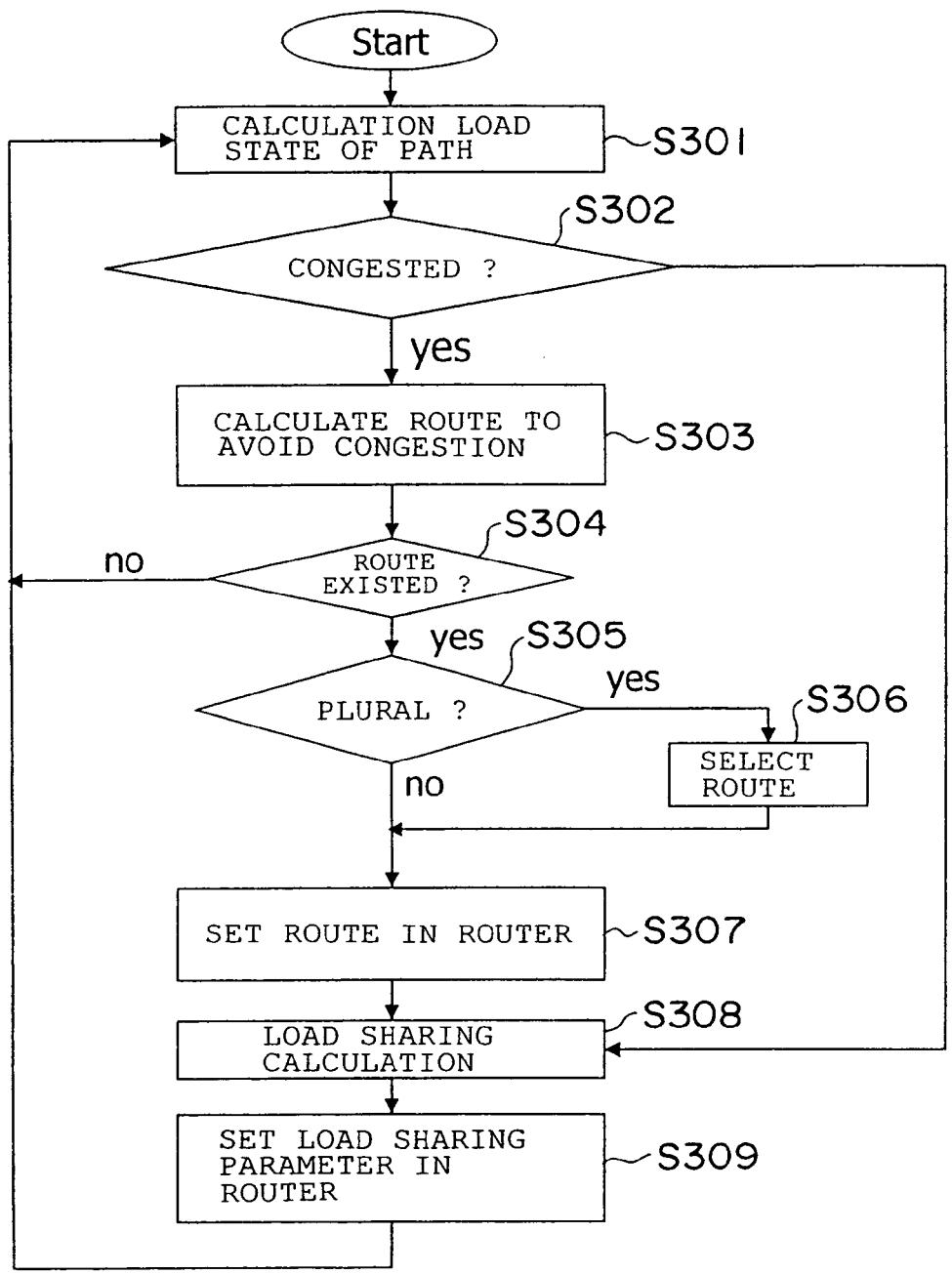
FIG. 15 shows a load balancing processing flow for BE.

FIG. 15 shows a processing flowchart of the load balancing process for BES when the BES flow needs the load balancing process. The BES-oriented congestion judging unit 15*c* of the load balancing control unit 15 in FIG. 12, refers to the statistical information about the cross-over links of the path from on the network information database 12 with respect to the path that has already been set up for BES, and calculates a load state of the path from these pieces of information (S301).

Next, the BES-oriented congestion judging unit 15*c* judges whether this path falls into a congestion or not (S302). At this time, the load state of the path can be derived by the existing execution load calculation. In this S302, the BES-oriented congestion judging unit 15*c*, in the case of judging that this path falls into the congestion, notifies the BES-oriented route calculation unit 14*b* of the route control unit 14 that it falls into the congestion.

The BES-oriented route calculation unit 14*b* having received the notification performs calculating a new route for the load balancing (S303). The calculation of the route for the load balancing at this time can be done by use of, for instance, the dynamic load balancing systems 1 and 2 in the policy 1.

The BES-oriented route calculation unit 14*b* having finished calculating the route for the load balancing, judges whether there is the calculated route or not (S304). In the case of judging at this time that there is no calculated route, the BES-oriented route calculation unit 14*b* executes again the process in S301.

In S304, in the case of deeming that there is a route steering clear of the congestion, the BES-oriented route calculation unit 14*b* judges whether there are a plurality of these routes or not (S305). In S305, when the BES-oriented route calculation unit 14*b* deems that there are the pluralities of routes, the route selection is performed (S306). At this time, the BES-oriented route calculation unit 14*b* effects the route selection according to, e.g., the route selection systems 1 through 6 in the embodiment. After making the route selection, the BES-oriented route calculation unit 14*b* instructs the router control unit 16 to set up the route.

The router control unit 16 having received the route information gives the instruction of setting up the path on the route (S307). Further, the BES-oriented route calculation unit transfers the route information to the router control unit and thus gives the instruction of setting up the path on the route. The router control unit, based on the received route information, sets up the path for the routers in the network. On the other hand, the BES-oriented load balancing control unit 15*b*, periodically or in a set time, calculates a forwarding ratio of the BES flow between the (plural) paths for BES that are set up at that point of time (S308).

At this time, the BES-oriented load balancing control unit 15*b* may give an instruction of, for, e.g., the GS flow, forwarding the flow in a way that sets up the path on the single route which meets the quality request, and may give an instruction of, for the BES flow, setting up the paths on the plurality of routes and forwarding the flow by balancing it with these paths. Moreover, at this time, the BES-oriented load balancing control unit 15*b* may give an instruction of, for, e.g., the BES flow, forwarding the flow by setting up the path on the single route, and may give an instruction of, for the GS flow, setting up the paths on the plurality of routes and forwarding the flow by use of the path designated among these paths.

Then, the BES-oriented load balancing control unit 15*b* notifies the router control unit 16 of its result as load balancing parameters (the router setting information). The router control unit 16 refers to the received load balancing parameters and effects setting for the routers that carry out the load balancing (S309).

Figure 16:
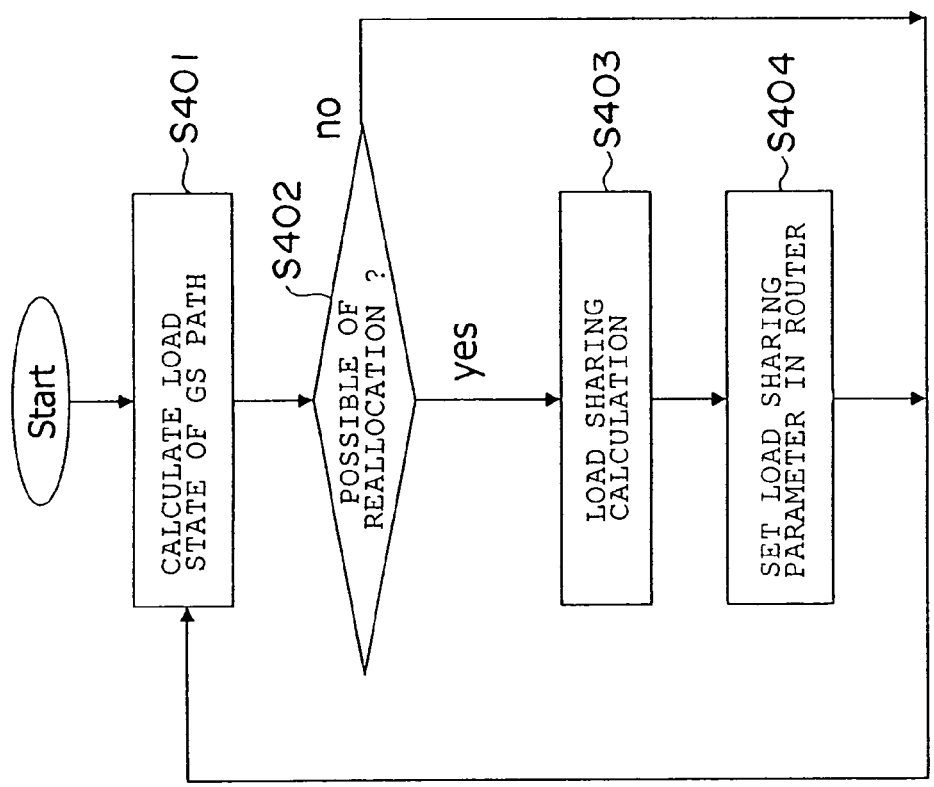
FIG. 16 shows a load balancing process flow for GS.

FIG. 16 shows a processing flowchart of the load balancing process for GS. This load balancing process for GS is that a load state for GS is calculated at all times, and the load balancing process for GS is executed corresponding to this state.

The GS-oriented load balancing control unit 15*b* of the load balancing control unit 15 in FIG. 12, with respect to the paths already set up in the network, refers to the statistical information about the cross-over links of the paths from on the network information database 12, and calculates load states of the paths from these pieces of information (S401).

Then, the load judging unit 15*d* for GS judges whether or not the load of this path is equal to or smaller than the threshold value. When the load of this path is equal to or smaller than the threshold value, the load judging unit 15*d* for GS notifies the GS-oriented load balancing control unit 15*a* of this purport. The GS-oriented load balancing control unit 15*a* having received this notification judges whether this path can be reallocated or not (S402). In a process in this S402, for judging whether the path can be reallocated or not, the GS-oriented load balancing control unit 15*a* can involve using, for example, the reallocation systems 1 through 6 for the GS flow.

When the GS-oriented load balancing control unit 15*a* judges that the load of this path is equal to or smaller than the threshold value, it specifies the paths with which the GS flow is shared and calculates a balancing ratio thereof (S403). Then, the GS-oriented load balancing control unit 15*a* notifies the router control unit 16 of a load balancing result as load balancing parameters (the router setting information).

The router control unit 16 sets the received load balancing parameters for the routers that executes the load balancing process (S404). After setting, the GS-oriented load balancing control unit 15*a* executes the process in S401 in order to calculate again the load state of the path.

Figure 17:
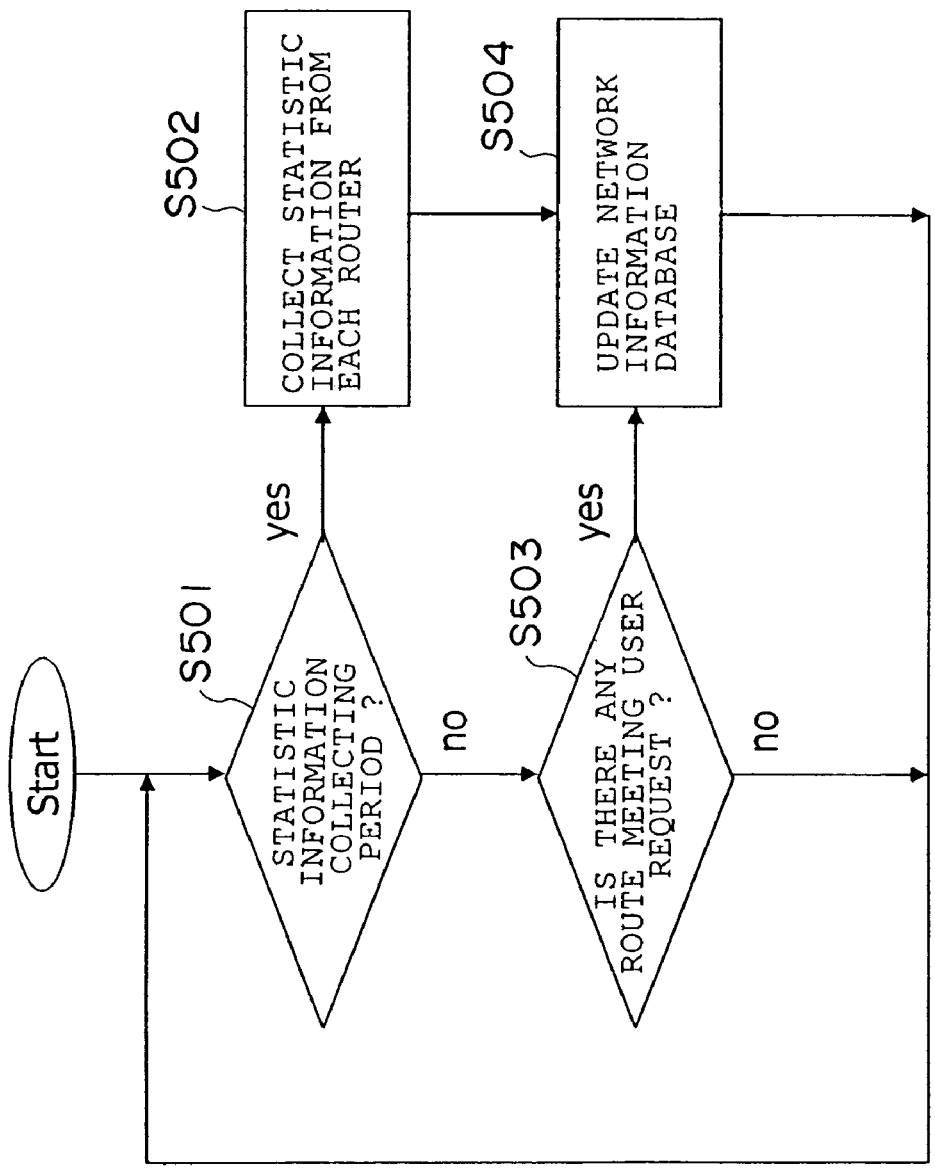
FIG. 17 shows a network information database update processing flow.

FIG. 17 is a flowchart showing a network information database updating process. The statistical information collecting unit 11 in the network control device 10 judges whether it reaches an interval of a predetermined period or a predetermined time or not (S501). When reaching this predetermined period or time, the statistical information collecting unit 11 access the intra-network device. Then, the statistical information collecting unit 11 collects pieces of information, such as a link reservation bandwidth, a link using ratio, etc. which are retained by this device (S502). Thereafter, the statistical information collecting unit 11 updates corresponding pieces of link information within the network information database 12 to values collected (S504).

Further, the route calculation unit 14*a* gives a GS flow forwarding request from the user to the network control device 10, and judges as a result thereof whether there is a route that meets the requested quality or not (S503). In this S503, when the route is discovered, the bandwidth reservation value, etc. is updated with respect to each of the links on the set-up route on the network information database (S504).

<Flowchart of GS Accepting Process>

Figure 29:
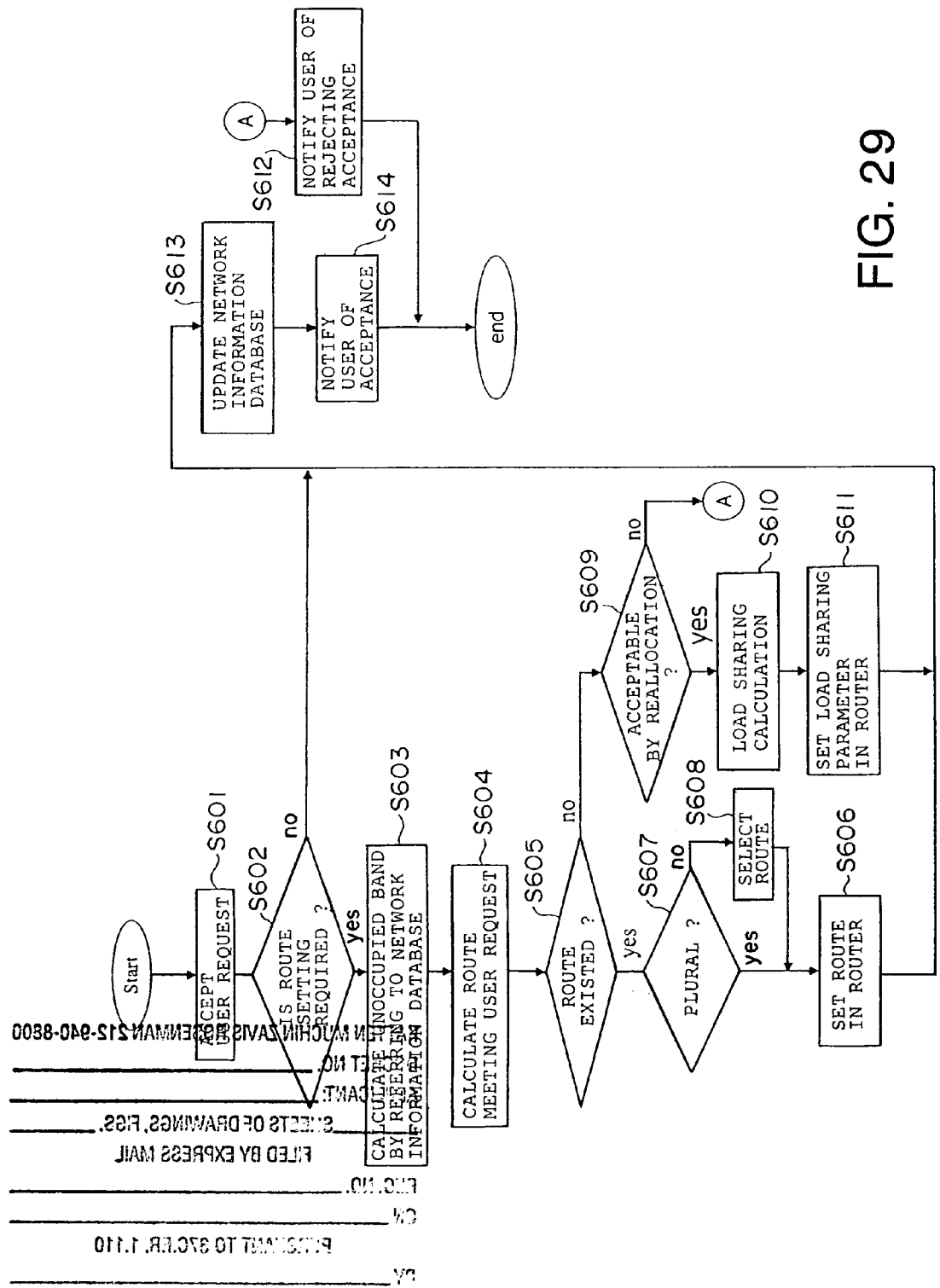
FIG. 29 shows a GS accept processing flow.

FIG. 29 is a flowchart showing a GS accepting process in the embodiment. The user request processing unit 13 of the network control device 10 accepts a forwarding request of the GS flow having a certain quality from the user (S601).

Next, the user request processing unit 13 judges whether or not there is a necessity of setting up the route which meets the user request (S602). At this time, when unnecessary for setting up the route, the network control device 10 updates the network information database and notifies the user of an acceptance.

Further, when judging in S602 that the set-up of the route is needed, the route control unit 14 calculates a residual bandwidth by referring to the network information database 12 (S603).

Thereafter, the user request processing unit 13, in order to judge whether or not there is the route that meets the quality thereof, transfers a parameter representing the should-be-met quality to the GS-oriented route calculation unit 14a of the route control unit 14, and thus gives an instruction of calculating the route that meets the user request quality. The GS-oriented route calculation unit 14a executes calculating the route that meets the user request quality (S604).

The GS-oriented route calculation unit 14a executes a searching process as to whether or not there is the route that meets the quality with respect to the notified quality parameters (S605). This searching process involves using the link statistical information such as the link using ratio, the link bandwidth reservation value, the link delay, etc. which are stored on the statistical information database. Then, based on the link statistical information, the route searching is carried out by use of the Dijkstra algorithm which has been already stated, and pieces of information about the routes on the discovered route are outputted as route information. In the case of discovering the route that meets the user request as a result of searching for the route by the route control unit 14, the route information is transferred to the GS-oriented load balancing control unit 15a. Then, the GS-oriented load balancing control unit 15a executes the process in S606. In the case of discovering none of the routes that meet the user request as the result of searching for the route by the route control unit 14, the GS-oriented load balancing control unit 15a executes a process in S609.

In the case of deeming in S605 that there is the route meeting the user request, the route control unit 14 judges whether there are pluralities of these routes (S607).

Moreover, when the route control unit 14 deems in S106 that there are the pluralities of routes, the route selection is conducted (S608). At this time, the route control unit 14 selects the route in accordance with, for instance, the route selection systems 1 through 6 in the embodiment.

The GS-oriented load balancing control unit 15a having received the notification judges whether this path can be reallocated or not (S609). For judging in the process in this S609 whether the path can be reallocated or not, the GS-oriented load balancing control unit 15a can involve using, for example, the GS flow reallocation systems 1 through 6.

The GS-oriented load balancing control unit 15a of the load balancing control unit 15 in FIG. 12 refers to the statistical information about the cross-over links of the path from on the network information database 12, and calculates a load state of the path from these pieces of information (S610).

Then, the GS-oriented load balancing control unit 15a notifies the router control unit 16 a load balancing result thereof as load balancing parameters (the router setting information). The router control unit 16 sets the received load balancing parameters to the routers which executes the load balancing process (S611).

Note that in the case of judging in S609 that the path can not be reallocated, the user request processing unit 13 notifies the user terminal that the requested acceptance has been rejected (S612).

The route control unit 14 notifies the user request processing unit that the route search has become successful, and further updates the bandwidth reservation value, etc. with respect to each of the links on the set-up route on the network information database 12 (S613). The user request processing unit 13 notifies the user terminal that the set-up of the path has been completed (S614).

OTHER EXAMPLE 1

Other example of the sub-policy in the case of carrying out the policy 1 in the embodiment will hereinafter be shown. On this occasion, in terms of thinking of the example in the network in FIG. 5, the bandwidth of each of the links shall be 100 Mbps, and it shall be judged that the congestion occurs when the link using ratio becomes equal to larger than 90%.

Figure 18:
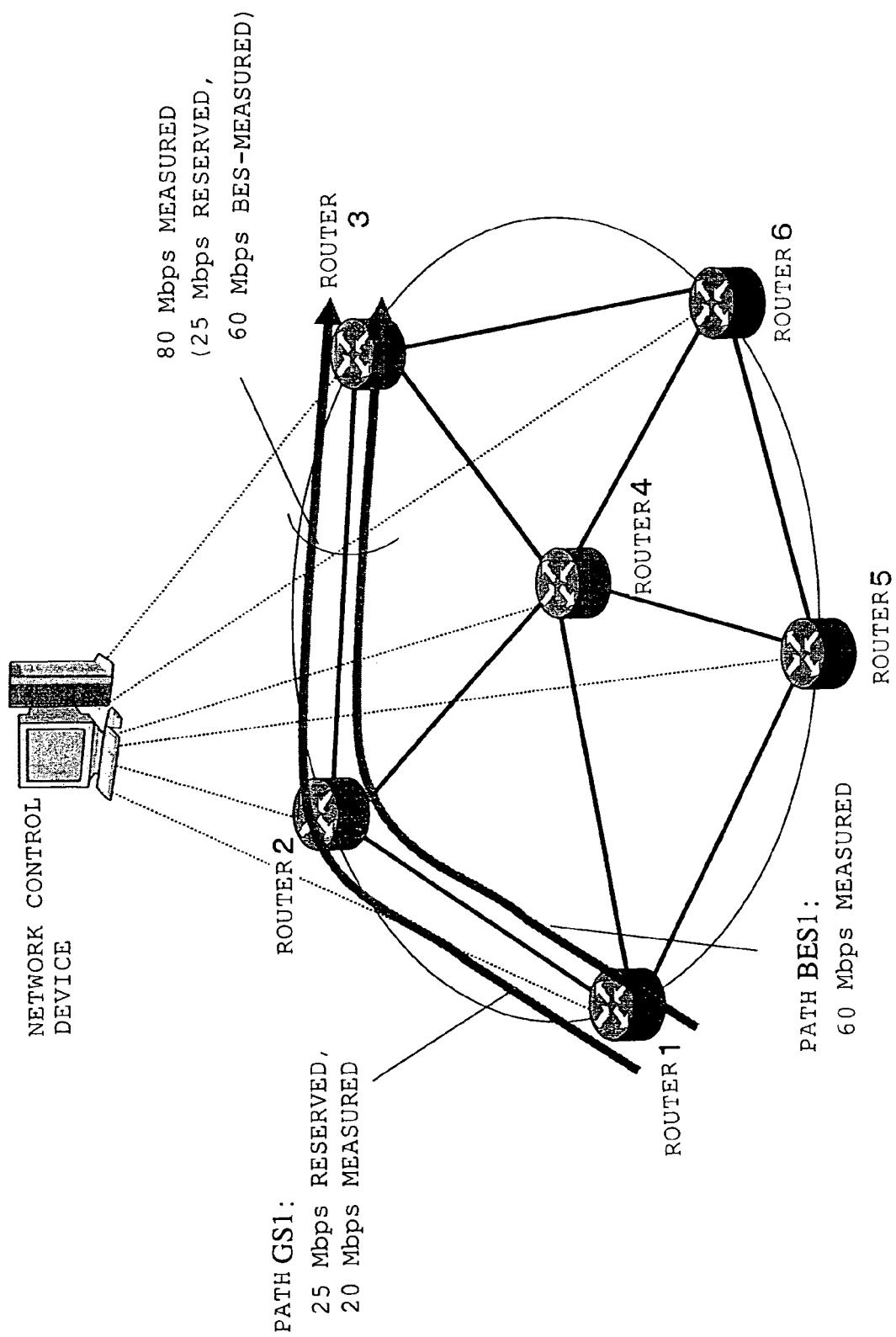
FIG. 18 shows an example (1-1) of the invention.

To start with, a network control system in the policy 1 will be contemplated. It is contemplated from a state in which, as illustrated in FIG. 18, a path GS1 for the GS flow (this type flow will hereinafter be called the GS flow, and the path for the GS flow will hereinafter be called a GS path) and a path BES1 for the flow that does not guarantee the forwarding quality such as the bandwidth, the delay, etc. (this type of flow will hereinafter be called the BES flow, and the path for the BES flow will hereinafter be called a BES path), are set up respectively on a route of the router 1—the router 2—the router 3. At this time, a bandwidth of 25 Mbps is reserved for the path GS1, and in fact traffic of 20 Mbps is assumed to flow therethrough. Further, at this time, traffic of 60 Mbps is assumed to flow through the path BES1. Then, observing a link between the router 2 and the router 3, 25 Mbps is reserved in a bandwidth of 100 Mbps, it can be understood that as a traffic quantity that actually flows totals to 80 Mbps including 20 Mbps of the GS flow and 60 Mbps of the BES flow.

The example about the sub-policy prescribed according to the definition of the residual bandwidth, will be given as follows.

When selecting the route for the flow that does not guarantee the forwarding quality such as the bandwidth, the delay, etc. (e.g. BES flow), the ratio of remaining bandwidth into which a bandwidth for the GS and BES is subtracted, is used as a link's available bandwidth (a sub-policy 28).

When selecting the route for the flow that does not guarantee the forwarding quality such as the bandwidth, the delay, etc. (e.g. BES flow), remaining bandwidth into which a bandwidth for the GS and BES is subtracted, is used as a link's available bandwidth (a sub-policy 29).

When selecting the route for the flow that does not guarantee the forwarding quality such as the bandwidth, the delay, etc. (e.g. BES flow), a ratio of the remaining bandwidth into which to subtract a bandwidth for the BES flow from the link bandwidth with respect to a bandwidth that is not reserved for the GS flow is used as a link's residual bandwidth (a sub-policy 30).

When selecting the route for the flow that guarantees the forwarding quality such as the bandwidth, the delay, etc. (e.g. GS flow), a remaining bandwidth into which a bandwidth for the GS flow is subtracted from bandwidths utilizable for the GS flow, is used as a link's residual bandwidth (a sub-policy 31).

When selecting the route for the flow that guarantees the forwarding quality such as the bandwidth, the delay, etc. (e.g. GS flow), a ratio of the remaining bandwidth into which to subtract the bandwidth for the GS flow with respect to the bandwidths utilizable for the GS flow, is used as a link's residual bandwidth (a sub-policy 32).

At this time, let WL be the link bandwidth, let WG be the bandwidth reserved for the GS flow, let Wg be the bandwidth for the GS flow that actually flows, let WB be the bandwidth used for the BES flow, and let Wb the bandwidth for the BES flow that actually flows.

In an example of the link between the router 2 and the router 3 in FIG. 18, WL=100 Mbps, WG=25 Mbps, Wg=20 Mbps, and Wb=60 Mbps. A bandwidth declared by the user and a bandwidth defined for the BES flow by the administrator can be user for WB. As for the sub-policy 28, a formula (a): WL−(WG+WB), a formula (b): WL−(WG+Wb) and a formula (c): WL−(Wg+Wb) can be used for the link's residual bandwidth used when selecting the route for the BES flow.

Similarly as for the sub-policy 29, a formula (d): 1−(WG+WB)/WL, a formula (e): 1−(WG+Wb)/WL and a formula (f): 1−(Wg+Wb)/WL can be used for the link's residual bandwidth used when selecting the route for the BES flow.

Further, as for the sub-policy 30, a formula (g): 1−Wb/(WL−WG) and a formula (h): 1−WB/(WL−WG) can be used for the link's residual bandwidth used when selecting the route for the BES flow.

For instance, if the formula (b) is used for the link's residual bandwidth used when selecting the route for the BES flow, the residual bandwidth becomes 15 Mbps in the example of the link between the router 2 and the router 3 in FIG. 18.

While on the other hand, as by the prior art, the residual bandwidth, when obtained without distinguishing between the traffic of the BES flow and the traffic of the GS flow, becomes 20 Mbps. Herefrom, when the BES flow is increased by 20 Mbps, the BES flow totals to 80 Mbps, however, 25 Mbps being reserved for the GS path, and, if the GS flow on the order of 25 Mbps comes to flow, a total thereof exceeds the link bandwidth, with the result that a part of the BES flow is to be discarded. Herein, using the definition in the embodiment, even if the BES flow is increased by an amount of the residual bandwidth and the GS flow comes to flow fully through the reserved bandwidth, the total does not exceed the link bandwidth. Accordingly, the policy 1 has such an effect as to decrease a probability that the BES flow is to be discarded.

Further, as for the sub-policy 31, C1 is defined as a coefficient representing a reservable ratio for the GS flow in the link bandwidth, and C2 is defined as a coefficient to which the statistical multiplexing effect is added. Moreover, the link's residual bandwidth used when selecting the route for the GS flow can involve using a formula (1): (C1*WL)−WG, a formula (2): (C1*WL)−Wg and a formula (3): C2*(C1*WL)−WG. Herein, the coefficient C1 may be defined as what decreases corresponding to a number n of the BES flows existing in that link. Namely, C1=f (n). This enables the residual bandwidth utilizable for the GS flow to be restricted small with respect to the link having, for instance, a large number of BES flows.

Similarly, a sub-policy 33 is prescribed such that "when accepting requests for a service which guarantees the forwarding quality such as the bandwidth, the delay, etc. and for a service which does not guarantee the forwarding quality such as the bandwidth, the delay, etc., routes is selected according to the respectively predetermined route selection policies, the route is determined from a topology taking allowances for only the link of which the link's residual bandwidth is equal to or larger than the request bandwidth when accepting the request for-the service which guarantees the forwarding quality such as the bandwidth, the delay, etc., and the route is determined from a topology taking allowances for all the links when accepting the request for the service which does not guarantee the forwarding quality such as the bandwidth, the delay, etc.".

As for this sub-policy 33, the link's residual bandwidth used when selecting the route for the GS flow can involve using a formula (4): 1−WG/(C1*WL), a formula (5): 1−Wg/(C1*WL) and a formula (6): 1−WG/(C2*C1*WL).

Figure 19:
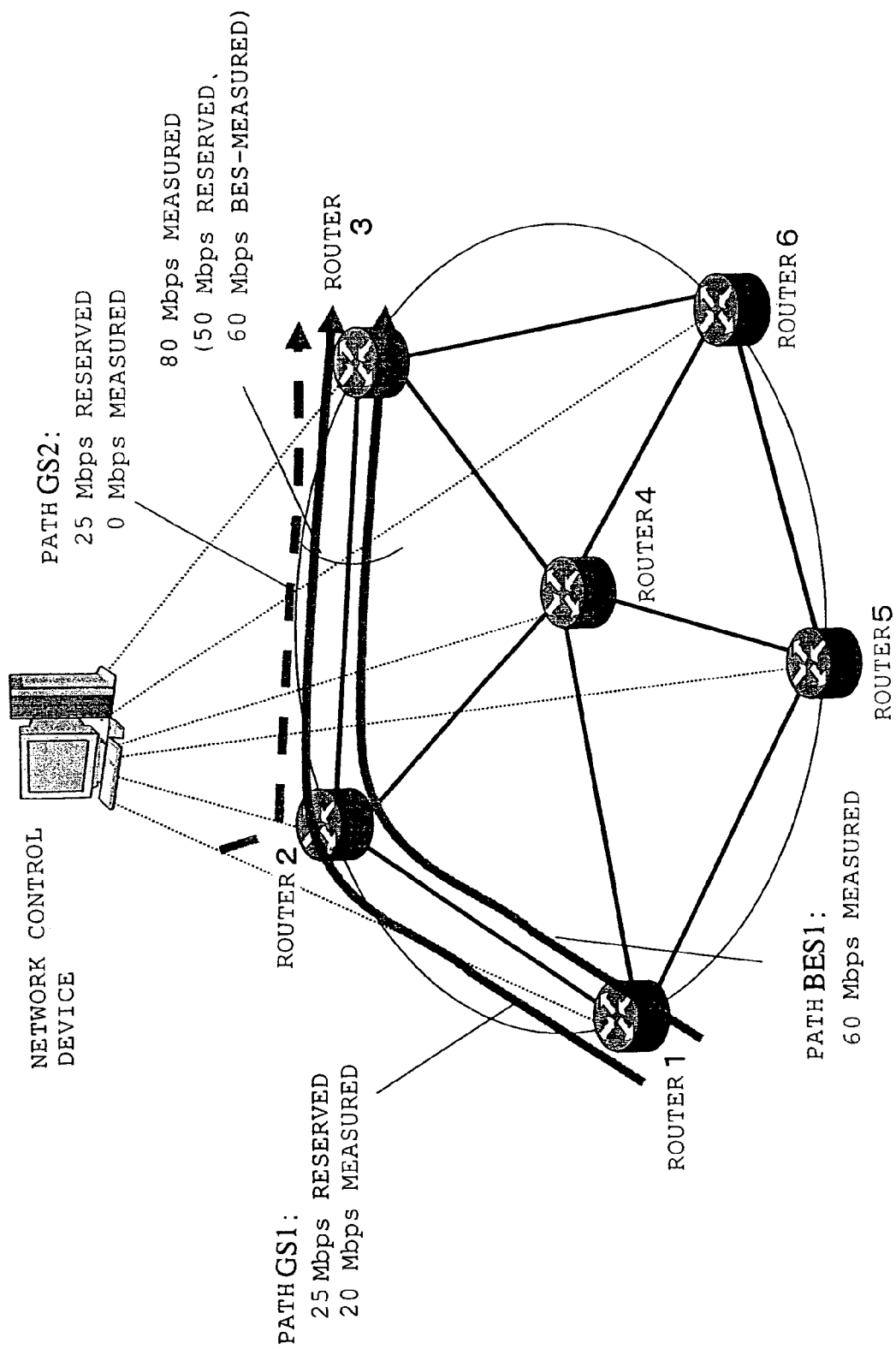
FIG. 19 shows an example (1-2) of the-invention.

Next, as shown in FIG. 19, it is assumed that a new GS path GS2 be set up with a reservation of the bandwidth of 25 Mbps on the route between the router 2 and the router 3. Herein, an assumption is that the actual traffic does not yet flow. At this time, an actually-flowing traffic quantity totals to 80 Mbps of 60 Mbps of the BES flow and 20 Mbps of the GS flow, however, totally 50 Mbps for the GS flow is reserved. According to the prior art, the control is done based on the actually-flowing traffic quantity of 80 Mbps without distinguishing between the traffic of the BES flow and the traffic of the GS flow. In this case, the link using ratio becomes 80% but does not exceed a threshold value of 90%, and hence it is not judged that the congestion occurs, wherein the load balancing operation is not executed. When the traffic of 25 Mbps comes to flow through the path GS2, a traffic of totally 105 Mbps of 20 Mbps from the path GS1, 25 Mbps from the path GS2 and 60 Mbps from the path BES1 will flow to the link between the router 2 and the router 3 in excess of the link bandwidth, resulting in an occurrence of discarding of the traffic of the BES flow.

On the other hand, in the policy 1, with an application of such a sub-policy that "there is included a function of setting a threshold value in a ratio (a maximum value in a ratio of the actual using bandwidth for the non-guaranteed service to the bandwidth not ensured for the quality guaranteed service in the physical bandwidth of the link configuring the path), of the actual using bandwidth for the service that does not guarantee the forwarding quality such as the bandwidth, the delay, etc., at which to occupy a bandwidth left by subtracting the bandwidth ensured for the service that guarantees the forwarding quality such as the bandwidth, the delay, etc. in the path, and, in the case of exceeding the threshold value, the flow that does not guarantee the forwarding quality such as the bandwidth, the delay, etc. is shifted to the detour route", this ratio becomes 20% given by Wb/(WL−WG)=60/(100−50)=1.2, and it is judged that the congestion occurs due to an excess over the threshold value.

As a result, a different BES path is extended in the network, thus executing the load balancing operation of shifting a part of the BES flow thereto. For instance, supposing that the control is done so that the residual bandwidths of the respective links of the respective paths are uniformized as the residual bandwidth for the BES flow, the result turns out as shown in FIG. 20.

Figure 20:
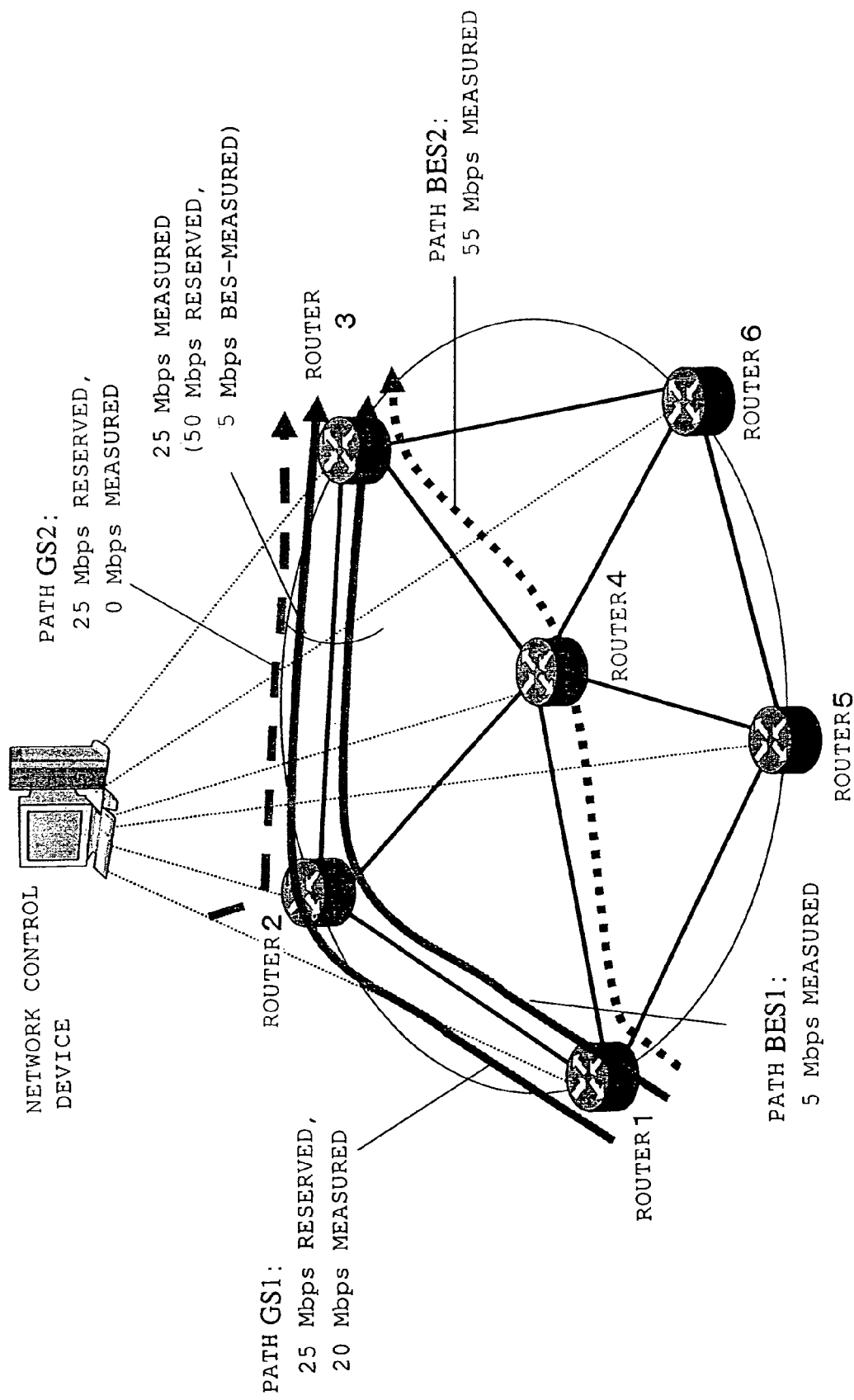
FIG. 20 shows an example (1-3) of the invention.
Figure 21:
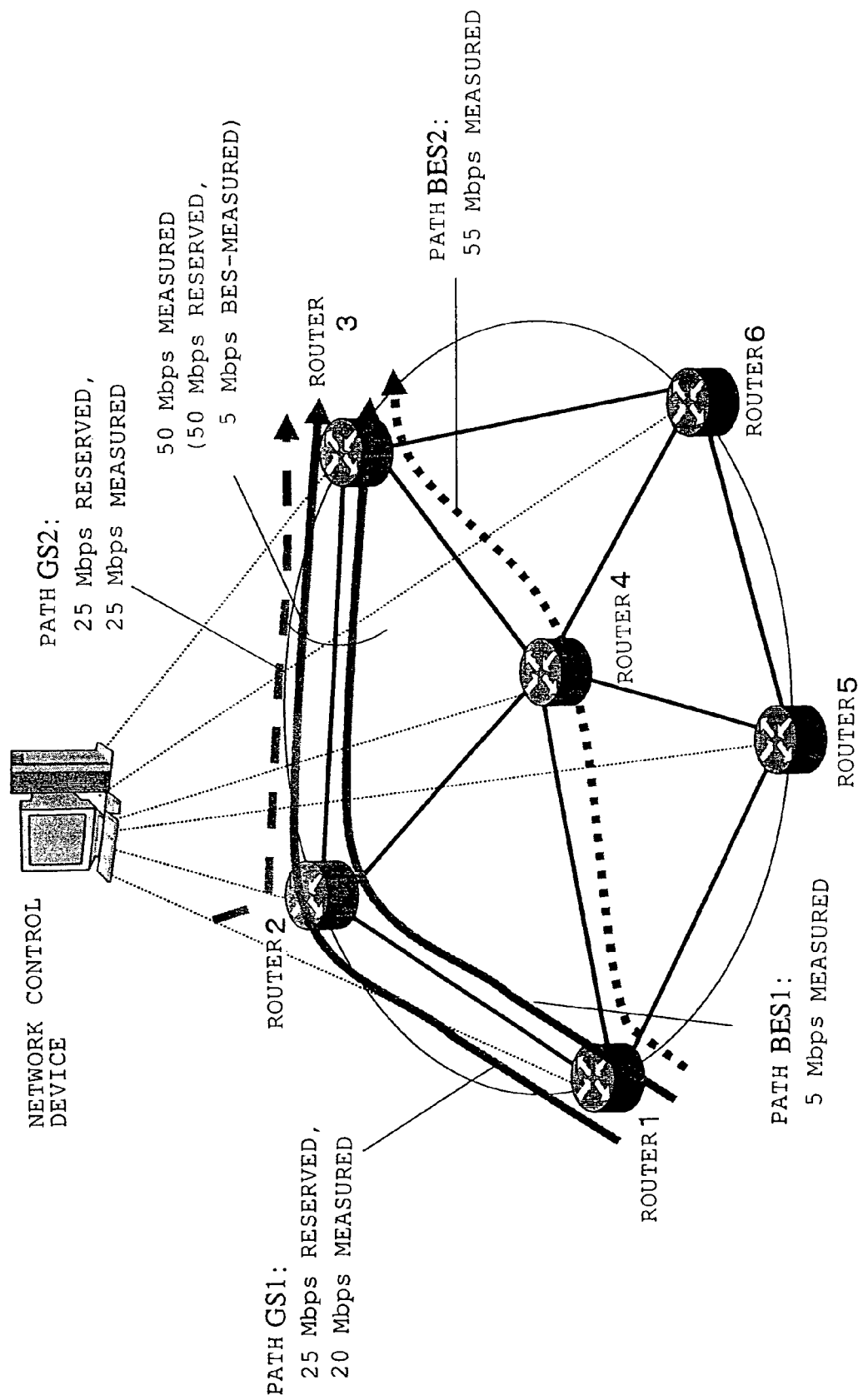
FIG. 21 shows an example (1-4) of the invention.

FIG. 20 shows a result in which the sub-policies 2, 4, 6, 9 are applied, a route of the router 1—the route 4—the router 3 is selected in a way that sets a new BES path as BES2, and a flow of 55 Mbps is shifted. Therefore, even if traffic of 25Mbps flows to the path GS2, it becomes as shown in FIG. 21. Accordingly, it does not happen that the traffic is discarded as in the prior art. Thus, the use of the embodiment enables a quantity of the traffic discarded to be reduced by effecting the load balancing of the BES flow while taking the bandwidth reserved for the GS flow into consideration.

OTHER EXAMPLE 2

Figure 22:
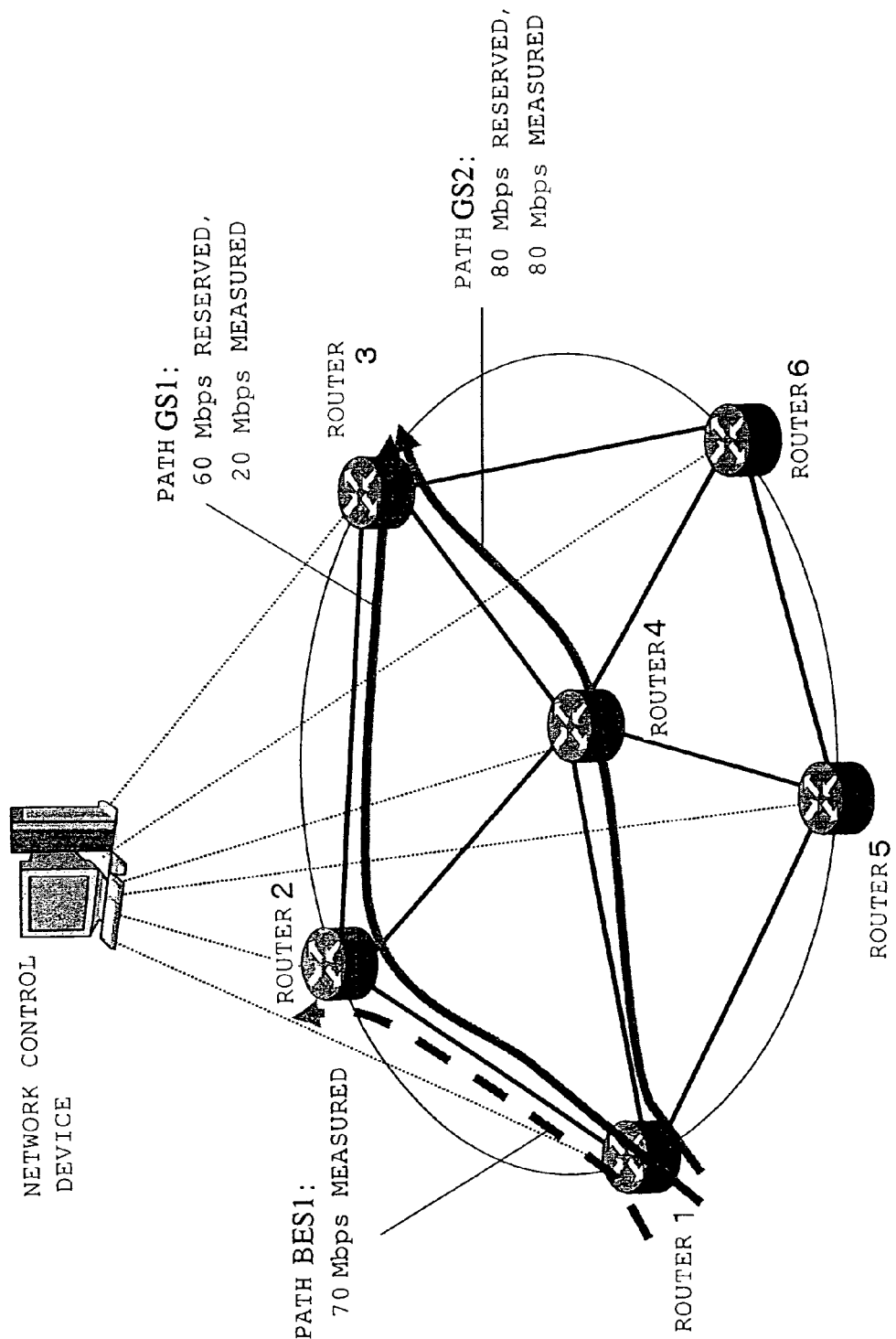
FIG. 22 shows an example (2-1) of the invention.

Next, a network control system in other example 2 for carrying out the policy 2 in the embodiment will be contemplated. As illustrated in FIG. 22, it is assumed that the GS path GS1 be set up on a route of the router 1—the router 2—the router 3, the GS path GS2 be set up on a route of the router 1—the router 4—the router 3 and BES1 as the BES path be set up on a route of the router 1—the router 2, respectively. An assumption is that the path GS1 with a reservation on the order of 60 Mbps receives an actual flux of 20 Mbps flow, the path GS2 with a reservation on the order of 80 Mbps receives an actual flux of 80 Mbps flow, and the path BES1 receives an actual flux of 70 Mbps flow.

Considered herein is a case of scheming to make the GS flow of 30 Mbps flow to the router 3 from the router 1. The prior art does not take the traffic of the BES flow into account when calculating the router of the GS flow, and hence the path GS1 accommodates the requested flow, or there is a possibility wherein a new GS path is extended on the same route as the path GS1. As a result, the GS flow of 50 Mbps comes to flow to the link between the router 1 and the router 2. Therefore, the BES flow within the path BES1 is allowed to flow by only 50 Mbps equivalent to the remaining of the link bandwidth, and it follows that 20 Mbps is to be discarded. On the other hand, it is considered to apply the systems in the embodiment. At this time, the example of the residual bandwidth may have contemplation about the same case as the above-mentioned.

When selecting a route for a u flow, a remaining bandwidth into which bandwidth for the GS flow and for the BES flow is subtracted, is used as a link's residual bandwidth (a sub-policy a).

When selecting the route for the flow that does not guarantee the forwarding quality such as the bandwidth, the delay, etc. (e.g. BES flow), a ratio of the remaining bandwidth to the entire link having the total bandwidth for the GS flow and for the BES flow, is used as a link's residual bandwidth (a sub-policy b).

When selecting the route for the flow that does not guarantee the forwarding quality such as the bandwidth, the delay, etc. (e.g. BES flow), a ratio of a remaining bandwidth into which a bandwidth for the BES flow is subtracted from the link bandwidth with respect to a bandwidth unreserved for the GS flow, is used as a link's residual bandwidth (a sub-policy c).

When selecting the route for the flow that guarantees the forwarding quality such as the bandwidth, the delay, etc. (e.g. GS flow), a remaining bandwidth into which a bandwidth for the GS flow is subtracted from a bandwidth utilizable for the GS flow, is used as a link's residual bandwidth (a sub-policy d).

When selecting the route for the flow that guarantees the forwarding quality such as the bandwidth, the delay, etc. (e.g. GS flow), a ratio of the remaining bandwidth into which the bandwidth for the GS flow is subtracted from the link bandwidth with respect to the bandwidth utilizable for the GS flow, is used as a link's residual bandwidth (a sub-policy e).

Figure 23:
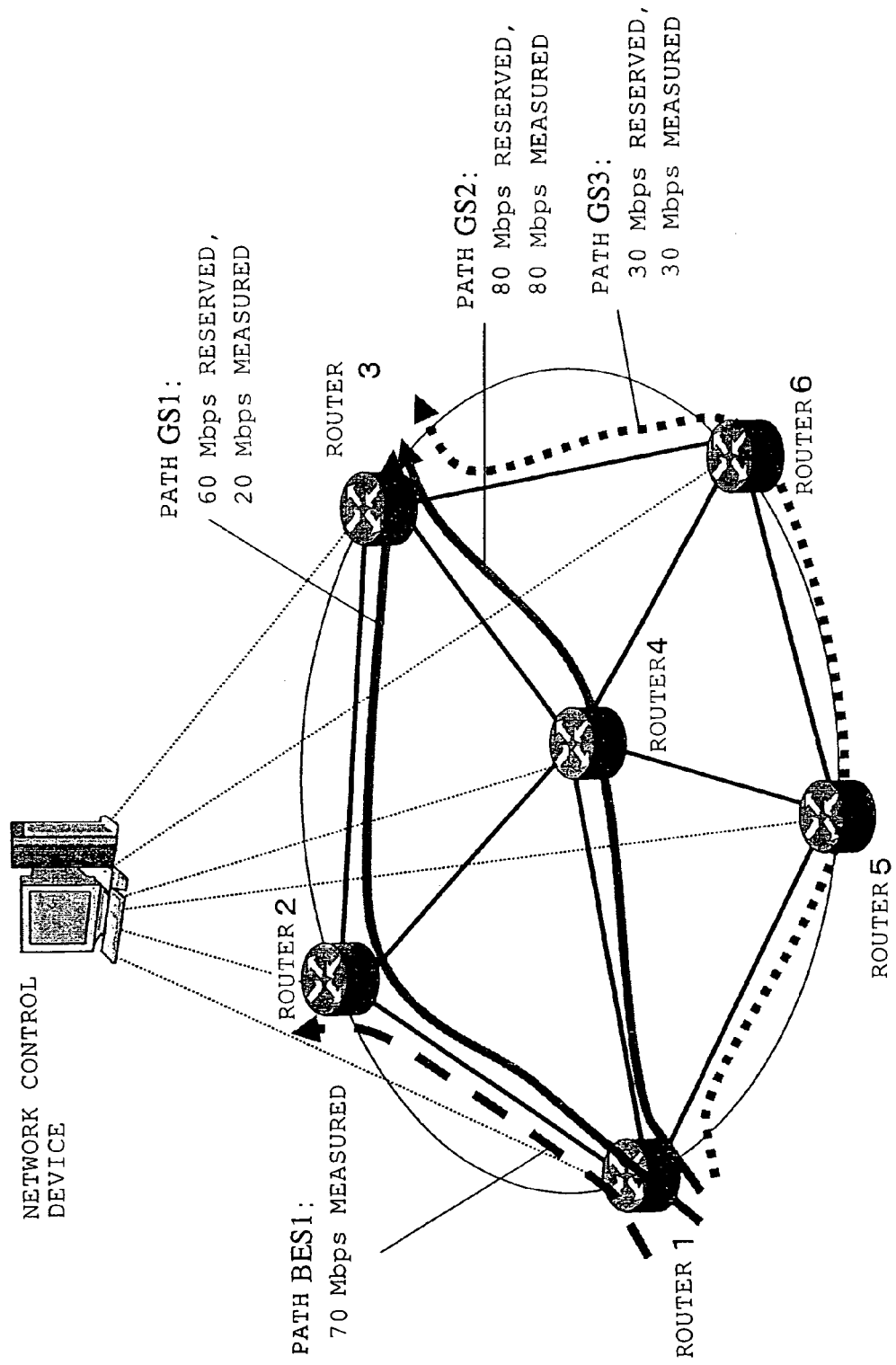
FIG. 23 shows an example (2-2) of the invention.

Applied when calculating the route for the GS flow is a sub-policy that "there is made a selection from a topology in which to connect a link of which a using bandwidth for a service that does not guarantee the forwarding quality such as the bandwidth, the delay, etc. does not exceed a threshold value and of which a residual bandwidth obtained by a calculation of a link's using bandwidth is equal to or larger than the request bandwidth". Herein, the threshold value of the BES flow shall be 50 Mbps. At this time, the link between the router 1 and the router 2 is in excess of the threshold value of the BES flow and is therefore excluded from the topology, and the link between the router 1 and the router 4 and the link between the router 4 and the router 3 have no residual bandwidth equal to or larger then the request bandwidth and are therefore excluded from the topology. As a result, the route calculated for this GS flow becomes a route of the router 1—the router 5—the router 6—the router 3. FIG. 23 illustrates a state when a flow of 30 Mbps comes into an actual flux, wherein GS3 is a path set up on this route. Thus, the use of the embodiment yields such an effect that a quantity of discarding the traffic of the BES flow can be decreased by taking allowances for the bandwidth for the BES flow when determining the path for the GS flow.

Figure 24:
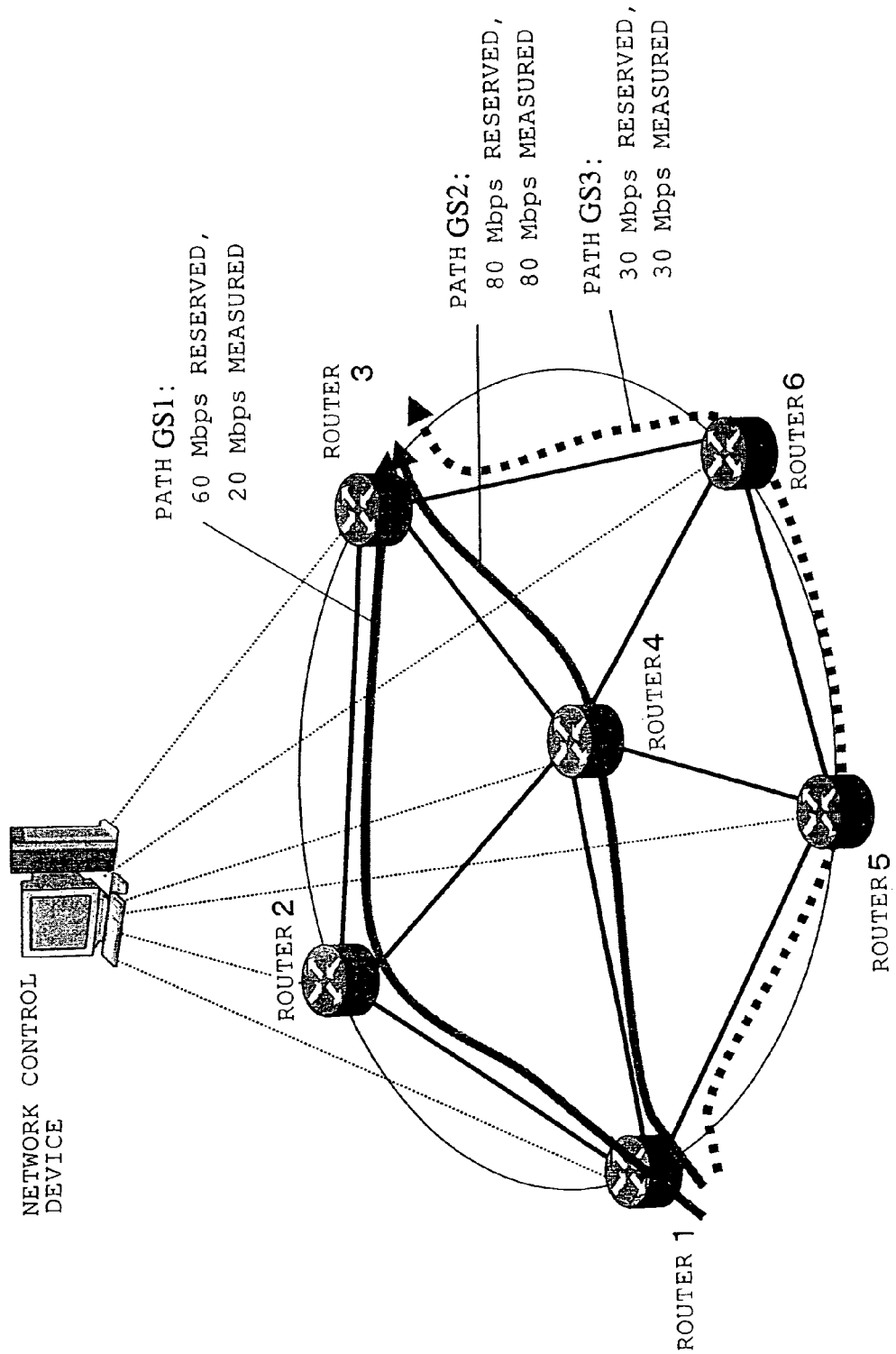
FIG. 24 shows an example (2-3) of the invention.
Figure 25:
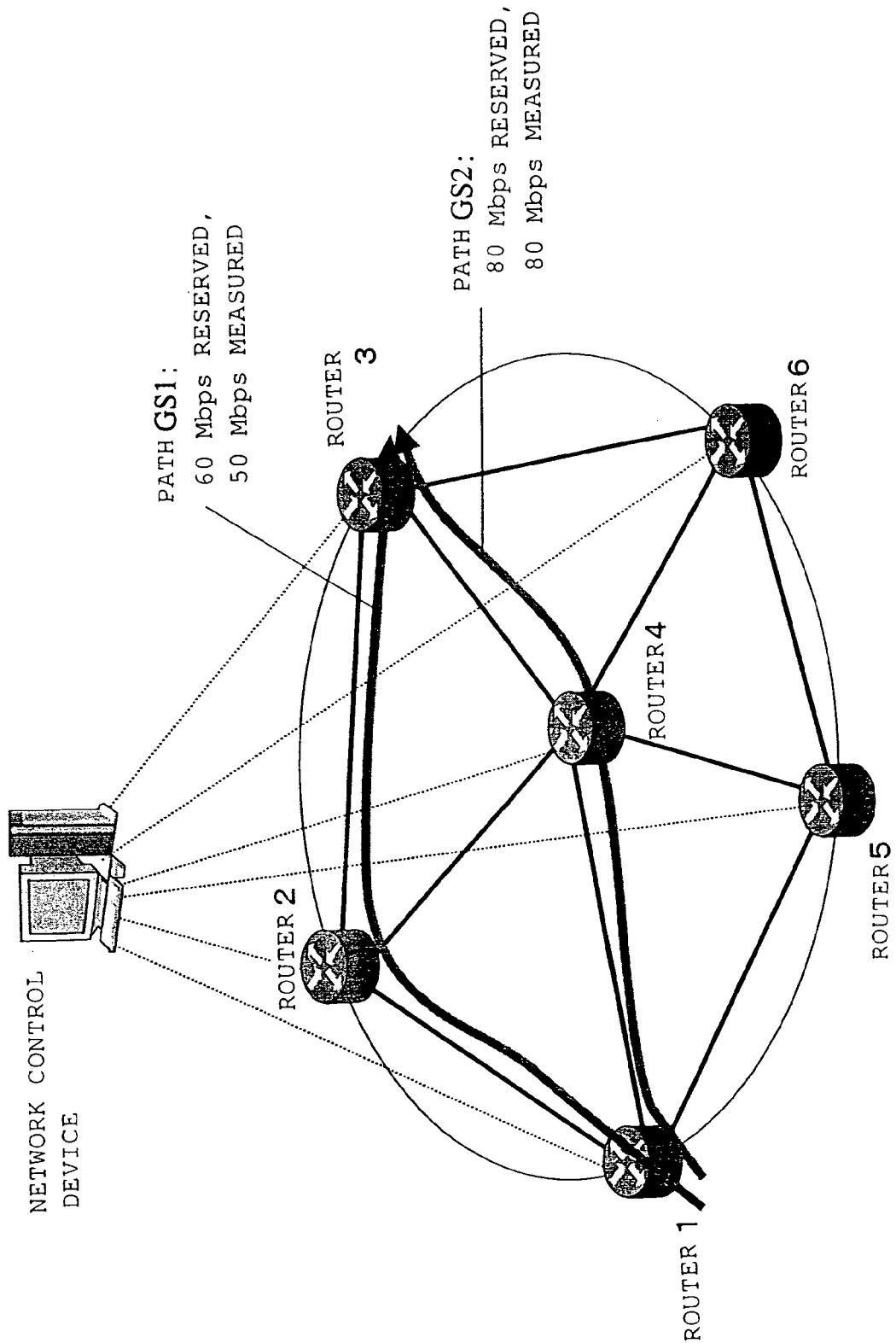
FIG. 25 shows an example (2-4) of the invention.

Next, it is considered when the flow of the path BES1 discontinues to flow from the state in FIG. 23 and turns out as shown in FIG. 24. According to the prior art, a dynamic change of the route for the GS flow is not conducted, and hence this state is maintained. In this state, however, the flow in the path GS3, in spite of a sufficient residual bandwidth being formed in the route on the path GS1, passes through a detour route, resulting in a poor bandwidth utilizing efficiency. Further, because of the detour route, there increase the hop count and the forwarding delay as well. It is therefore desired that the GS flow across the detour route be shifted to a more proper route. At this time, it is considered to use in the embodiment a sub-policy that "there is included a function of setting a threshold value in a path using ratio (a maximum value in a ratio of the actual using bandwidth to the physical bandwidth of the link configuring the path), and, when there is a residual bandwidth for accommodating the quality guaranteed flow when less than the threshold value and there exists other less optimal path, the quality guaranteed flow is shifted to the path less than the threshold value from the less optimal path". At this time, the threshold value is set at 30%. Then, the using ratio of the link on the path GS1 is 20% and is thus less than the threshold value, and hence the flow shift takes place. Herein, the path GS3 is the detour route, so that the flow in the path GS3 is shifted to the path GS1. FIG. 25 shows a result when the whole flow in the path GS3 is shifted to the path GS1. Thus, the use of the embodiment come to enable, the GS flow being shifted, the link using efficiency to be improved and also the forwarding delay of the GS flow to be decreased.

Figure 26:
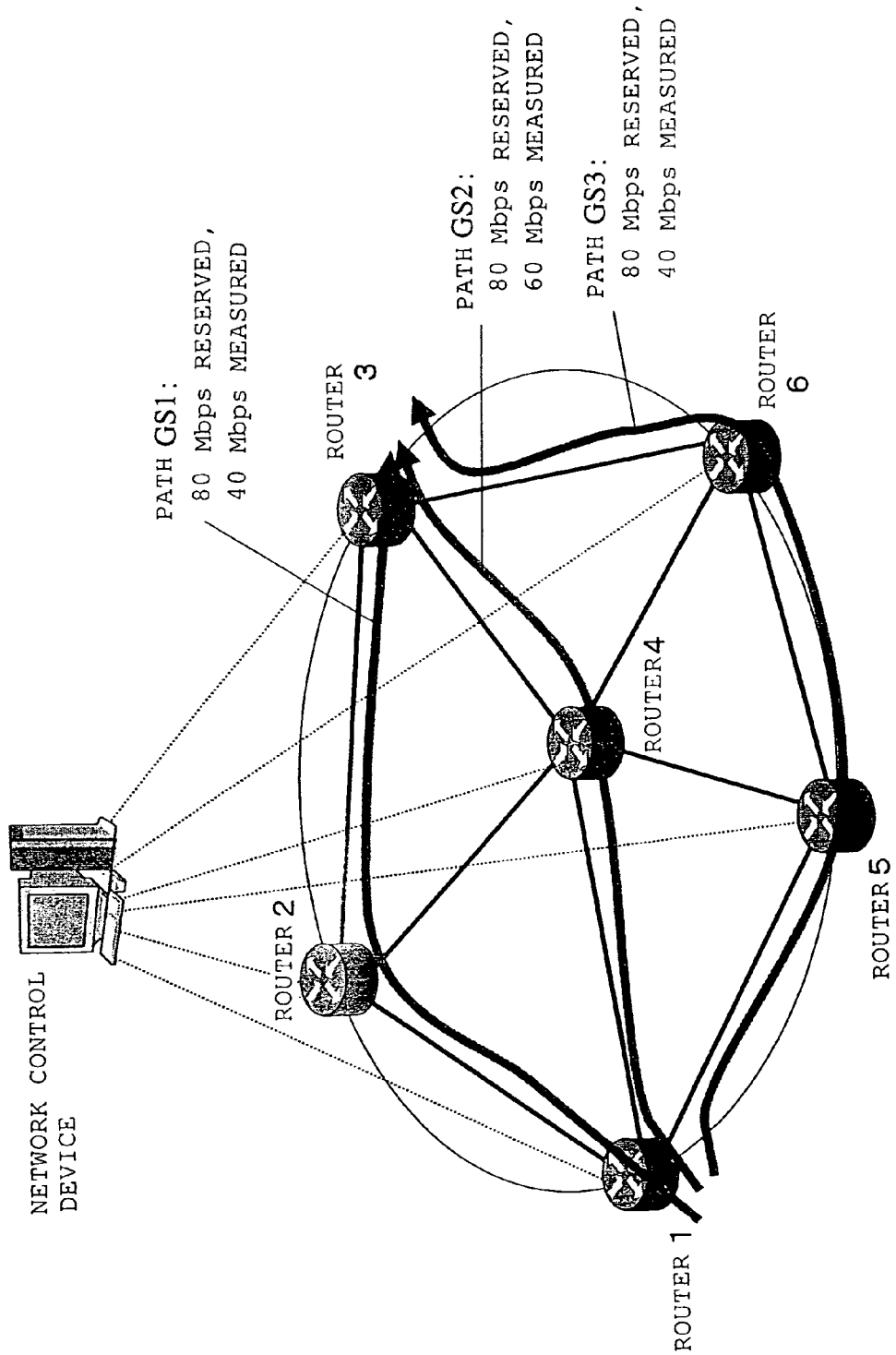
FIG. 26 shows an example (3-1) of the invention.
Figure 27:
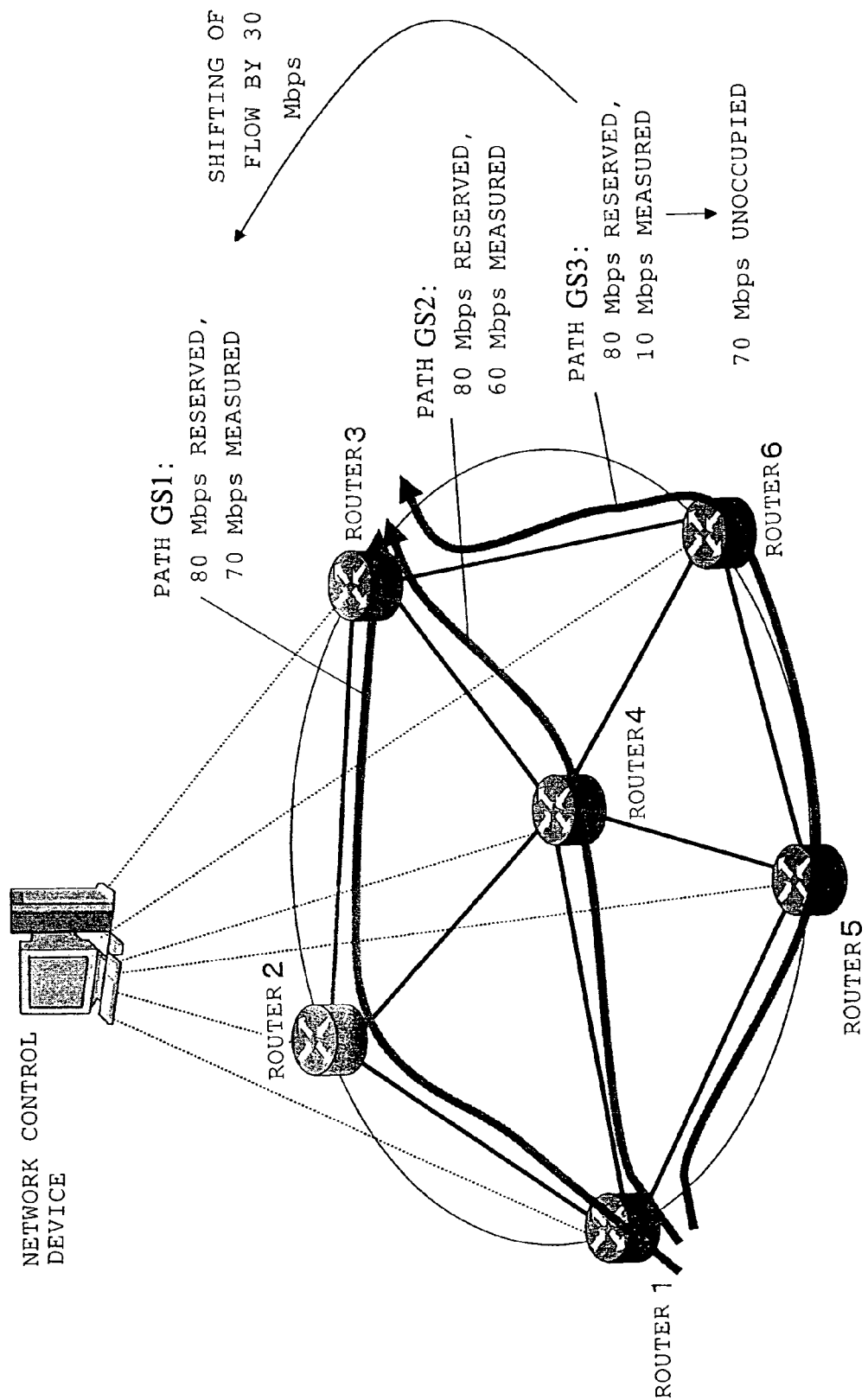
FIG. 27 shows an example (3-2) of the invention.

Moreover, as shown in FIG. 26, there is considered a case where the GS path GS1 is set up on the route of the router 1—the router 2—the router 3, the GS path GS2 is set up on the route of the router 1—the router 4—the router 3 and the GS path GS3 is set up on the route of the router 1—the router 5—the router 6—the router 3, respectively. It is assumed that each of the path GS1, the path GS2 and the path GS3 has a reservation of 80 Mbps, the path GS1 and the path GS3 receive an actual flux of 40 Mbps flow, and the path GS2 receives an actual flux of 60 Mbps flow. In such a state, an assumption is that the router 1 gives a request for the GS flow of 70 Mbps to the router 3. According to the prior art, since the route capable of ensuring a bandwidth for 70 Mbps is not discovered, the acceptance is rejected. The embodiment, however, uses a sub-policy that "in a state where a plurality of paths are set up for the GS flow, in the case of being unable to ensure the request bandwidth for the quality guaranteed service due to a small residual bandwidth but in the case of being able to ensure the request bandwidth by shifting the existing flows accommodated in the plurality of paths, the request is to be accepted by effecting the flow shift". Then, if 30 Mbps in the flow of the path GS3 is shifted to the path GS1, the requested 70 Mbps flow can be accepted by use of the path GS3. This state is illustrated in FIG. 27. Thus, the use of the embodiment enables a decrease of the possibility that the user request falls into a call loss by shifting the GS flow.

<Effects of the Embodiment>

According to the invention, owing to the policy 1, the non-guaranteed traffic is forwarded by use of the different detour route obtained taking allowances for the quality guaranteed traffic and can be thereby forwarded without being influenced by the intra-link quality guaranteed traffic, whereby the congestion can be avoided. Moreover, the bandwidth utilizing efficiency can be improved.

Further, owing to the policy 2, the quality guaranteed traffic is forwarded in a way that steers clear of the link having the high utilizing ratio of the non-guaranteed traffic, whereby the influence of the non-guaranteed traffic upon the quality guaranteed traffic can be reduced. Furthermore, the setting of the plural routes and the dynamic flow reallocation can gain a rise in the quality guaranteed service accommodation efficiency, thereby making it possible to improve the bandwidth utilizing efficiency, to reduce the call loss ratio and to reallocate the quality guaranteed flow to the optimal route in accordance with the change in traffic.

MODIFIED EXAMPLES

In the embodiment, the transmission bandwidth control device of the invention has been described, however, the invention is not limited to this and can be embodied widely for other transmission bandwidth control devices.

In the embodiment, the transmission bandwidth control system of the invention is embodied by a centralized control system, however, the transmission bandwidth control system of the invention is not limited to this. Namely, the invention is capable of controlling by an autonomous distributed control system. At this time, all the functions actualized by the network control device 10 are executed on the side of an edge router (ER), whereby the autonomous distributed control system that does not use a centralized control serve can be embodied in the embodiment.

Further, in the embodiment, the settings of the policies and the sub-policies may be settings unified in the network and may also be settings different between the individual links. Namely, in the network, the routes in which the sub-policy 1 is applied to the GS flow and the routes in which the sub-policy 2 is applied thereto, may exist in mixture. For example, images are distributed by streaming to the route where the sub-policy 1 is applied. Moreover, data are distributed by FTP (File Transfer Protocol) to the route where the sub-policy 2 is applied. The policy may be selected corresponding to content to be transmitted. In this case, it follows that the routes based on the policies exist in mixture in the network.

What is claimed is:

1. A transmission bandwidth control device for controlling a transmission route for a flow in a network, comprising:
a statistical information collecting unit for collecting pieces of statistical information from respective routers connected to the network;
a network information database for storing the statistical information collected;
a user request processing unit for accepting and processing a flow forwarding request from a user terminal;
a route control unit for searching for a route corresponding to the request from the user terminal by referring to the network information database;
a load sharing control unit for executing such a load sharing process as to generate router setting information for sharing a transmission load of the network by referring to the network information database; and
a router control unit for setting a router based on the route information determined by the route control unit and on the router setting information generated by the load sharing control unit,
wherein the route control unit includes a quality guaranteed route searching module searching for quality guaranteed route information corresponding to the flow forwarding request for the forwarding quality guaranteed flow by referring to link statistical information concerning links between the respective routers from the network information database and a quality non-guaranteed route searching module searching for quality non-guaranteed route information corresponding to the flow forwarding request for the forwarding quality non-guaranteed flow, by referring to link statistical information concerning links between the respective routers from the network information database, the load sharing control unit executes the load sharing process by referring to the quality guaranteed route information and the quality non-guaranteed route information, and the router control unit sets the quality guaranteed route and the quality non-guaranteed route in accordance with the searched quality guaranteed route information and quality non-guaranteed route information,
wherein in the case where the quality guaranteed route searching module selects such a route as to minimize a cross-over hop count in the network, the quality non-guaranteed route searching module selects such a route as to maximize a residual bandwidth in the network;
wherein the quality non-guaranteed route searching module, when selecting a route for a flow that does not guarantee a forwarding quality, uses a ratio of a remaining bandwidth, as a link's residual bandwidth, which is a result of subtracting the bandwidth for the flow that does not guarantee the forwarding quality from a link bandwidth as link's physical bandwidth, with respect to a bandwidth unreserved for the flow that guarantees the forwarding quality.

2. A transmission bandwidth control device according to claim 1, further comprising a load judging unit for judging whether or not a load state of a path is equal to or smaller than the threshold value by referring to the link statistical information, when the load state of the path is equal to or smaller than the threshold value, the quality guaranteed route searching module searches for the quality guaranteed route information, the load sharing control unit executes the load sharing process by referring to the quality guaranteed route information, and the router control unit sets the quality guaranteed route in accordance with the quality guaranteed route information.

3. A transmission bandwidth control device according to claim 1, wherein the load sharing control unit executes the load sharing process at an interval of a predetermined period.

4. A transmission bandwidth control device according to claim 1, wherein the quality guaranteed route searching module searches for a single piece of route information that meets a requested quality as the quality guaranteed route, the quality non-guaranteed route searching module searches for plural pieces of route information as the quality non-guaranteed routes, and the router control unit sets a plurality of routes related to the quality non-guaranteed routes in accordance with the plural pieces of route information.

5. A transmission bandwidth control device according to claim 4, wherein at least one of the quality guaranteed route searching module and the quality non-guaranteed route searching module, at a point of time when selecting a route afresh, switches over a route selection system.

6. A transmission bandwidth control device according to claim 4, wherein the quality guaranteed route searching module when accepting a request for a service that guarantees a forwarding quality, makes a selection from a topology connecting links of which a using bandwidth for a service that does not guarantee the forwarding quality does not exceed a threshold value and of which a residual bandwidth obtained by a calculation of a link's using bandwidth is equal to or larger than the request bandwidth.

7. A transmission bandwidth control device according to claim 4, further comprising module referring to a threshold value related to a path using ratio, wherein the load sharing control unit, in the case of exceeding the threshold value related to the using ratio, shifts the flow that does not guarantee the forwarding quality to a detour route.

8. A transmission bandwidth control device according to claim 4, further comprising module referring to a threshold value related to a ratio at which an actual using bandwidth for a service that does not guarantee the forwarding quality occupies a bandwidth left by subtracting a bandwidth ensured for the service that guarantees the forwarding quality in a path, wherein the router control unit, when the ratio of the actual using bandwidth exceeds the threshold value, shifts the flow that does not guarantee the forwarding quality to a detour route.

9. A transmission bandwidth control device according to claim 4, wherein the quality non-guaranteed route searching module further includes module referring to a threshold value related to a ratio at which an estimated range of the using bandwidth for the service that does not guarantee the forwarding quality occupies a bandwidth left by subtracting a bandwidth ensured for such a service as to guarantee the forwarding quality in the path by accepting the estimated range of the using bandwidth when accepting a request for the service that does not guarantee the forwarding quality, and the router control unit, when the ratio exceeds the threshold value, shifts the flow that does not guarantee the forwarding quality to the detour route.

10. A transmission bandwidth control device according to claim 1, wherein the quality non-guaranteed route searching module searches for a single piece of route information as the quality non-guaranteed route, the quality guaranteed route searching module searches for plural pieces of route information as the quality guaranteed routes, and the router control unit sets a plurality of routes related to the quality guaranteed routes in accordance with the plural pieces of route information.

11. A transmission bandwidth control device according to claim 10, wherein at least one of the quality guaranteed route searching module and the quality non-guaranteed route searching module, at a point of time when selecting a route afresh, switches over a route selection system.

12. A transmission bandwidth control device according to claim 10, wherein at least one of the quality guaranteed route searching module and the quality non-guaranteed route searching module, when accepting a request for a service that guarantees a forwarding quality and a request for a service that does not guarantee the forwarding quality, selects a route in accordance with an individually predetermined route selection policy, and, when accepting the request for the service that guarantees the forwarding quality, determines a route from a topology taking allowances for a link of which a link's residual bandwidth is equal to or larger than the request bandwidth and for a link where a ratio at which a quality non-guaranteed traffic occupies the link does not exceed a predetermined reference value.

13. A transmission bandwidth control device according to claim 10, wherein the quality guaranteed route searching module when accepting a request for a service that guarantees a forwarding quality selects a route from a topology connecting links of which a using bandwidth for a service that does not guarantee the forwarding quality does not exceed a set threshold value and of which a residual bandwidth obtained by a calculation of the link's using bandwidth is equal to or larger than the request bandwidth.

14. A transmission bandwidth control device according to claim 10, wherein the load sharing control unit further includes module referring to a threshold value related to a path using ratio as a ratio of the used bandwidth to the entire bandwidth of the path, and, when the path using ratio is less than the threshold value, the router control unit, when there is a residual bandwidth for accommodating the quality guaranteed flow and there exists other less optimal path, shifts the quality guaranteed flow to the path of which the using ratio is less than the threshold value from the less optimal path.

15. A transmission bandwidth control device according to claim 10, wherein the load sharing control unit further includes module referring to a threshold value related to a bandwidth ensured for the service that guarantees the forwarding quality in the path, and, when the bandwidth ensured for the service is less than the threshold value, the router control unit, when there is a residual bandwidth for accommodating the quality guaranteed flow and there exists other less optimal path, shifts the quality guaranteed flow to an optimal path having the residual bandwidth.

16. A transmission bandwidth control device according to claim 10, wherein the load sharing control unit further includes module referring to a threshold value related to a ratio of a bandwidth ensured for the service that guarantees the forwarding quality to a bandwidth utilizable for the quality guaranteed service in the path, and, when the ratio is less than the threshold value, the router control unit, when there is a residual bandwidth for accommodating the quality guaranteed flow and there exists other less optimal path, shifts the quality guaranteed flow to an optimal path having the residual bandwidth.

17. A transmission bandwidth control device according to claim 10, wherein the load sharing control unit further includes module referring to a threshold value related to an actual using bandwidth as an actually used bandwidth among guaranteed bandwidth for the service that guarantees the forwarding quality in the path, and, when the actual using bandwidth is less than the threshold value, the router control unit, when there is a residual bandwidth for accommodating the quality guaranteed flow and there exists other less optimal path, shifts the quality guaranteed flow to an optimal path having the residual bandwidth.

18. A transmission bandwidth control device according to claim 10, wherein the load sharing control unit further includes module referring to a threshold value related to a ratio of an actually used bandwidth for the service that guarantees the forwarding quality to a bandwidth utilizable for the quality guaranteed service in the path, and, when the ratio is less than the threshold value, the router control unit, when there is a residual bandwidth for accommodating the quality guaranteed flow and there exists other less optimal path, shifts the quality guaranteed flow to an optimal path having the residual bandwidth.

19. A transmission bandwidth control device according to claim 10, wherein the load sharing control unit, in a state where a plurality of paths are set up for the flow that guarantees the forwarding quality, in the case of being unable to ensure a request bandwidth for the quality guaranteed service due to a small residual bandwidth but in the case of being able to ensure the request bandwidth by shifting the existing flows accommodated in the plurality of paths, accepts a request by effecting a flow shift.

20. A transmission bandwidth control device according to claim 1, wherein the quality guaranteed route searching module when there exist a plurality of such routes as to minimize the cross-over hop count between the network ingress node and the network egress node, selects such a route as to maximize a residual bandwidth therein between the network ingress node and the network egress node or such a route as to minimize a residual bandwidth therein between the network ingress node and the network egress node, and the quality non-guaranteed route searching module when there exist a plurality of such routes as to maximize the residual bandwidth between the network ingress node and the network egress node, selects such a route as to minimize a cross-over hop count therein between the network ingress node and the network egress node.

21. A transmission bandwidth control device according to claim 1, wherein the quality non-guaranteed route searching module, when selecting a route for a flow that does not guarantee a forwarding quality, a ratio of a remaining bandwidth which is a result of subtracting a bandwidth for a flow that guarantees the forwarding quality and for the flow that does not guarantee the forwarding quality from the entire link as a link's physical bandwidth, with respect to the entire link bandwidth, is used as a link's available bandwidth.

22. A transmission bandwidth control device according to claim 1, wherein the quality non-guaranteed route searching module, when selecting a route for a flow that does not guarantee a forwarding quality, a remaining bandwidth which is a result of subtracting a bandwidth for a flow that guarantees the forwarding quality and for the flow that does not guarantee the forwarding quality from the entire link as a link's physical bandwidth, is used as a link's available bandwidth.

23. A transmission bandwidth control device according to claim 22, wherein the quality non-guaranteed route searching module, when accepting a request for a service, determines a route from a topology taking allowances for the entire link.

24. A transmission bandwidth control device according to claim 1, wherein the quality guaranteed route searching module, when selecting a route for a flow that guarantees a forwarding quality, uses a remaining bandwidth, as a link's residual bandwidth, which is a result of subtracting the bandwidth for the forwarding quality guaranteed flow from a bandwidth utilizable for the forwarding quality guaranteed flow.

25. A transmission bandwidth control device according to claim 24, wherein the quality guaranteed route searching module, when accepting a request for a service, determines a route from a topology taking allowances for only a link of which a link's residual bandwidth is equal to or larger than the request bandwidth.

26. A transmission bandwidth control device according to claim 1, wherein the quality guaranteed route searching module, when selecting a route for a flow that guarantees a forwarding quality, uses a ratio of a remaining bandwidth, as a link's residual bandwidth, which is a result of subtracting a bandwidth for the forwarding quality guaranteed flow from a bandwidth utilizable for the forwarding quality guaranteed flow, with respect to the bandwidth utilizable for the forwarding quality guaranteed flow.

27. A transmission bandwidth control device according to claim 1, further comprising a congestion judging unit for judging by referring to the link statistical information whether a load state of the path falls into a congestion or not, wherein when the load state of the path falls into the congestion, the quality non-guaranteed route searching module searches for quality non-guaranteed route information, the load sharing control unit executes the load sharing process by referring to the quality guaranteed route information and the quality non-guaranteed route information, and the router control unit sets a quality non-guaranteed route in accordance with the quality non-guaranteed route information.

28. A transmission control method of controlling a transmission route for a flow in a network, comprising:
   collecting pieces of statistical information from respective routers connected to the network;
   accepting a flow forwarding request from a user terminal;
   quality-guaranteed-route searching for quality guaranteed route information corresponding to the request for forwarding the flow that guarantees a forwarding quality by referring to the network statistical information and the request from the user terminal;
   quality-non-guaranteed-route searching for a quality non-guaranteed route corresponding to the request for forwarding the flow that does not guarantee the forwarding quality by referring to the network statistical information and the request from the user terminal;
   executing such a load sharing process as to generate router setting information for sharing a transmission load of the network by referring to at least one of the network statistical information the quality guaranteed route information and quality non-guaranteed route information; and
   setting a router based on the router setting information, the quality guaranteed route information and the quality non-guaranteed route information,
   wherein in the case where the quality guaranteed route searching step selects such a route as to minimize a cross-over hop count in the network, the quality non-guaranteed route searching step selects such a route as to maximize a residual bandwidth in the network;
   wherein the quality non-guaranteed route searching step involves selecting a route for a flow that does not guarantee a forwarding quality, using a ratio of a remaining bandwidth, as a link's residual bandwidth, which is a result of subtracting the bandwidth for the flow that does not guarantee the forwarding quality from a link bandwidth as link's physical bandwidth, with respect to a bandwidth unreserved for the flow that guarantees the forwarding quality.

* * * * *